US007730320B2

(12) United States Patent
Satou et al.

(10) Patent No.: US 7,730,320 B2
(45) Date of Patent: Jun. 1, 2010

(54) METHOD FOR GENERATING DATA FOR DETECTION OF TAMPERING, AND METHOD AND APPARATUS FOR DETECTION OF TAMPERING

(75) Inventors: Tomoya Satou, Nara (JP); Makoto Fujiwara, Kyoto (JP); Kentarou Shiomi, Kyoto (JP); Yusuke Nemoto, Hyogo (JP); Yuishi Torisaki, Hyogo (JP); Kazuya Shimizu, Osaka (JP); Shinji Inoue, Osaka (JP); Kazuya Fujimura, Nara (JP); Makoto Ochi, Osaka (JP)

(73) Assignee: Panasonic Corporation, Osaka (JP)

( * ) Notice: Subject to any disclaimer, the term of this patent is extended or adjusted under 35 U.S.C. 154(b) by 1238 days.

(21) Appl. No.: 11/223,939

(22) Filed: Sep. 13, 2005

(65) Prior Publication Data

US 2006/0136749 A1 Jun. 22, 2006

(30) Foreign Application Priority Data

Dec. 16, 2004 (JP) ............................. 2004-363891
Jun. 24, 2005 (JP) ............................. 2005-185686

(51) Int. Cl.
*H04L 9/00* (2006.01)

(52) U.S. Cl. ....................................... 713/181; 713/168

(58) Field of Classification Search ................. 713/169, 713/181, 193, 194, 165–168, 176
See application file for complete search history.

(56) References Cited

U.S. PATENT DOCUMENTS 7,325,132 B2 * 1/2008 Takayama et al. ........... 713/168
2002/0169971 A1 * 11/2002 Asano et al. ................ 713/193
2003/0233559 A1 12/2003 Asano et al.
2004/0093505 A1 * 5/2004 Hatakeyama et al. ....... 713/189
2004/0098627 A1 * 5/2004 Larsen ....................... 713/202

FOREIGN PATENT DOCUMENTS

JP 63-225840 A 9/1988
JP 10-327142 A 12/1998
JP 2001-203686 A 7/2001
JP 2003-333030 A 11/2003
WO WO 00/45358 A1 8/2000
WO WO 00/49764 A 8/2000

* cited by examiner

OTHER PUBLICATIONS

"Research in Data Protection and Encryption," edited by Shin Hitotsumatsu, Nihon Keizai Shimbun, Inc., Jul. 29, 1983, First Edition, Japan, pp. 90-97.

*Primary Examiner*—Beemnet W Dada
(74) *Attorney, Agent, or Firm*—McDermott Will & Emery LLP

(57) ABSTRACT

In a target apparatus which stores at least one piece of domain key information in a first area and a plurality of pieces of content key information each associated with any one of the domain key information in a second area, a method for generating data for detecting tampering of the content key information. The method comprises the steps of encrypting the content key information associated with one of the domain key information using a chain encryption technique, extracting data at predetermined positions in the encrypted content key information, concatenating the pieces of data extracted at the predetermined positions in the encrypted content key information to obtain concatenated data, performing a hash calculation with respect to the concatenated data to obtain a hash value, storing check values corresponding to the data at the predetermined positions in plain text, in the target apparatus, and storing the hash value in the target apparatus.

21 Claims, 19 Drawing Sheets

Hash(i-j) = Hash function (info(i-j) || EncKt(i-j) || EncUR[t](i-j))

Hash(i) = Hash function(Hash(i-1) || Hash(i-2) || · · · || Hash(i-m))

Hash(i-j) = Hash function (info(i-j) || EncKt(i-j) || EncUR[t](i-j))

Hash(i-GrJ)) = Hash function (Hash(i-j) || • • • || Hash(i-k))

Hash(i) = Hash function (Hash(i-GrA) || Hash(i-GrB) || • • • || Hash(I-GrP))

Hash(i) = Hash function (Check(i-1) || Check(i-2) || ··· || Check(i-m))

METHOD FOR GENERATING DATA FOR DETECTION OF TAMPERING, AND METHOD AND APPARATUS FOR DETECTION OF TAMPERING

CROSS REFERENCE TO RELATED APPLICATIONS

This non-provisional application claims priority under 35 U.S.C. §119(a) on Patent Application No. 2004-363891 filed in Japan on Dec. 16, 2004 and Patent Application No. 2005-185686 filed in Japan on Jun. 24, 2005, the entire contents of which are hereby incorporated by reference.

BACKGROUND OF THE INVENTION

1. Field of the Invention

The present invention relates to a method and an apparatus of checking the authenticity of confidential information stored in a target apparatus or the presence or absence of tampering thereof.

2. Description of the Related Art

Contents relating to copyrighted works, identity information, or the like (e.g., representatively, music data and video data) have to be protected from unauthorized duplication or leakage to the outside. Such contents are stored in an encrypted state in a target apparatus. An authentication process is performed between a host apparatus and the target apparatus before the host apparatus handles the encrypted contents stored in the target apparatus. If the authentication fails, the host apparatus cannot obtain a content key for decrypting the encrypted contents from the target apparatus. If the authentication is successful, the host apparatus can access and use the contents stored in the target apparatus. With such a system, it is possible to prevent an unauthorized host apparatus from decrypting the encrypted contents. Note that the target apparatus is, for example, a memory card, such as an SD card or the like. The host apparatus is, for example, a semiconductor integrated circuit of reading data from the memory card, a set apparatus comprising the semiconductor integrated circuit, or a content distribution apparatus of distributing contents to a target apparatus.

Next, a storage area of a conventional target apparatus and confidential information stored in the storage area will be described with reference to FIG. 17. Note that, in the following description, confidential information refers to information which is required to reproduce contents (e.g. key information, etc.).

The storage area of the target apparatus is divided into a system area 901, a protected area 902, and an ordinary area 903. The system area 901 is an area in which information for performing authentication between the target apparatus and a host apparatus is stored. The host apparatus can access the system area 901 in only a predetermined process in which an access to the system area 901 is permitted. The protected area 902 is an area which cannot be arbitrarily accessed by the user (host apparatus), and can be accessed only after authentication is successful. The ordinary area 903 is an area which can be arbitrarily accessed by the user. In the system area 901, an authentication key is stored. In the protected area 902, an encrypted content key is stored. In the ordinary area 903, encrypted contents are stored.

Next, a method which is used by the host apparatus to decrypt and utilize the encrypted contents stored in the target apparatus, will be described. The host apparatus performs authentication using an authentication key stored in itself and an authentication key stored in the target apparatus. If the authentication is successful, the host apparatus uses these authentication keys to generate an intermediate authentication key. The intermediate authentication key is defined as a key for decrypting the encrypted content key. Therefore, the host apparatus obtains the encrypted content key from the target apparatus, and decrypts the encrypted content key using the intermediate authentication key to generate a content key in plain text (unencrypted form). Further, the host apparatus obtains the encrypted contents from the target apparatus, and uses the content key in plain text to decrypt the encrypted contents to generate contents in plain text. Thereby, the contents can be put to use. By performing the above-described process, only a host apparatus which is successful for authentication can utilize encrypted contents stored in a target apparatus.

In the above-described content decryption, if authentication is successful, an intermediate authentication key is generated, and therefore, if authentication is successful, encrypted contents can be decrypted. Therefore, any authorized host apparatus can utilize encrypted contents stored in a target apparatus.

In recent years, there has been an active movement such that encrypted contents are transmitted via an electronic distribution system to a specific user so that only the specific user can utilize the contents. In such an electronic distribution system, however, the encrypted contents transmitted to the specific user need to be decrypted by only a specific host apparatus possessed by the specific user. However, this requirement is not satisfied by the above-described method.

Therefore, a method has been newly proposed in which a valid domain key is set for only a specific user. When the domain key is set, contents are encrypted using a content key, and the content key is encrypted using the domain key set for only the specific user, but not using an intermediate authentication key. Further, the domain key itself is encrypted using an intermediate authentication key or another key generated based on information of the intermediate authentication key, and is then stored in a target apparatus. Thereby, the confidentiality of the domain key itself is secured.

Confidential information stored in the storage area of a target apparatus when the domain key is thus set, will be described with reference to FIG. 18. Even when the domain key is set, the area of a target apparatus needs to be divided in the same manner as that of conventional target apparatuses in order to maintain compatibility therewith. If both the domain key and the content key are stored in the protected area 902, the domain key is stored in the area having the same security level as that of the content key, though the domain key is a key which is used to decrypt the content key. Therefore, to maintain the security and the compatibility, when the domain key is set, the domain key is stored in an encrypted state in the protected area 902. The content key is stored in an encrypted state in the ordinary area 903.

However, as described above, the ordinary area 903 is an area which can be arbitrarily accessed by the user. Therefore, it is important to certify the authenticity of the encrypted content key stored in the ordinary area 903. In other words, it is important to check tampering thereof.

Note that a technique relating to the present invention is described in Japanese Unexamined Patent Publication No. 2001-203686. In Japanese Unexamined Patent Publication No. 2001-203686, a piece of content data is divided into a plurality of portions, a check value is calculated for each portion, and the check value is compared with a check value previously held. Thereby, it is possible to perform a tampering check for only a required portion.

However, a piece of content data is only divided into portions. The technique is basically different from the present invention, in which, as described below, when there are a plurality of content keys corresponding to one domain key, a tampering check is performed by matching of data buried in the domain key in association with these content keys.

Hereinafter, the confidential information stored in the target apparatus will be described in greater detail with reference to FIG. 19. In the protected area 902 of the target apparatus, n encrypted domain keys Ku(1) to Ku(n) (n is an integer of 1 or more) are stored. The domain keys Ku(1) to Ku(n) are given n pieces of domain key management information UR[u](1) to UR[u](n) in one-to-one correspondence.

In the ordinary area 903 of the target apparatus, a plurality of content keys are stored. Each content key corresponds to any one of the domain keys Ku(1) to Ku(n). In other words, one domain key can be used to decrypt a plurality of encrypted content keys. For example, the domain key Ku(1) corresponds to m content keys Kt(1-1) to Kt(1-m) (m is an integer of 1 or more). The content keys Kt(1-1) to Kt(1-m) are given m pieces of content key management information UR[t](1-1) to UR[t](1-m) and m pieces of additional information info(1-1) to info(1-m) in one-to-one correspondence.

Note that, in FIG. 19, a set of the domain keys Ku(1) to Ku(n) and the domain key management information UR[u](1) to UR[u](n) is referred to as a "domain key group UKURE", and a set of the content keys Kt(1-1) to Kt(1-m), the content key management information UR[t](1-1) to UR[t](1-m), and the additional information info(1-1) to info(1-m) is referred to as a "content key group TKURE(1)".

Decryption of encrypted contents requires a content key in plain text. Also, decryption of an encrypted content key requires a domain key. To quickly determine which content key is encrypted using which domain key, a key correspondence table Address List is also stored in the ordinary area. On the key correspondence table Address List, a correspondence relationship between domain keys and content keys is described. For example, the domain key Ku(1) is associated with the content keys Kt(1-1) to Kt(1-m) which can be decrypted using the domain key.

To check if confidential information stored in a target apparatus has been tampered as described above, a method of using a hash function for each piece of confidential information is generally employed. Also in general, when a hash calculation is used to check tampering of confidential information, the hash calculation is carried out over all information relating to the confidential information.

Next, a description will be given of the case where a hash function is used to check tampering with respect to confidential information stored in a target apparatus. Note that the term "Enc" is used as a prefix indicating an encrypted state. For example, "EncUR[u](1)" indicates the domain key management information UR[u](1) which is encrypted.

Encrypted content keys EncKu(1-1) to EncKu(1-m), which can be decrypted using the domain key Ku(1), encrypted content key management information EncUR[t](1-1) to EncUR[t](1-m) corresponding to the encrypted content keys EncKt(1-1) to EncKt(1-m), and additional information info(1-1) to info(1-m) corresponding to the encrypted content keys EncKt(1-1) to EncKt(1-m) are concatenated together to perform a hash calculation. A hash value obtained by the hash calculation is stored into the domain key management information UR[u](1).

Next, in order to decrypt the encrypted content key EncKt(1-1), the host apparatus references the key correspondence table Address List to read the content key group TKURE(1) from the ordinary area 903 of the target apparatus, and performs a hash calculation. Also, the host apparatus uses an intermediate authentication key obtained by authentication to decrypt the encrypted domain key management information EncUR[u](1) stored in the protected area 902 of the target apparatus. Next, the host apparatus extracts a hash value from the domain key management information UR[u](1) obtained by the decryption. Next, the host apparatus compares the hash value obtained by the hash calculation with the hash value extracted from the domain key management information UR[u](1). When these hash values match, the host apparatus determines that tampering is not present, and decrypts an encrypted content key. When the hash values do not match, the host apparatus determines that tampering is present, and does not decrypt encrypted contents.

However, the tampering check method of FIG. 19 requires a huge amount of calculation. Specifically, to check tampering with respect to a single content key (content key Kt(1-1)), the host apparatus needs to read all content keys which can be decrypted using the same domain key and all information accompanying them (the content key group TKURE(1)) from the target apparatus and perform a hash calculation with respect to the read information. Particularly, as the number of contents stored in the target apparatus is increased, the number of content keys is increased. As a result, the number of content keys associated with a single domain key is increased, so that a processing time also increases.

It may be assumed that contents and a content key are distributed as a set of data over a network or the like. In this case, a content key associated with a domain key may be added/deleted. However, in conventional methods, when a content key is added/deleted, a hash calculation needs to be performed again with respect to all content keys corresponding to a domain key (e.g., the domain key Ku(1), etc.) and information accompanying the content keys (e.g., the content key group TKURE(1), etc.), and the calculated hash function needs to be buried into domain key management information accompanying the domain key (e.g., the domain key management information UR[u](1), etc.).

SUMMARY OF THE INVENTION

An object of the present invention is to provide a tampering check method having a small processing amount, thereby performing a high-speed tampering check. More specifically, in a confidential information processing system in which contents are protected by being encrypted a plurality of times, when a plurality of content keys are associated with one domain key and are stored in an area which can be accessed by the user, a tampering check for the content key is performed with a small processing amount to prevent unauthorized duplication of the contents.

According to a first aspect of the present invention, in a target apparatus which stores at least one domain key in a first area and a plurality of pieces of content key information each associated with any one of the at least one domain key in a second area different from the first area, a method for generating data for detecting tampering of the content key information. The method comprises the steps of encrypting the plurality of pieces of content key information associated with one of the at least one domain key using a chain encryption technique, extracting data at predetermined positions in the plurality of pieces of content key information encrypted, concatenating the pieces of data extracted at the predetermined positions in the plurality of pieces of content key information encrypted to obtain concatenated data, performing a hash calculation with respect to the concatenated data to obtain a chain hash value, storing check values corresponding to the pieces of data at the predetermined positions, the pieces of data being in plain text, in the target apparatus, and storing the chain hash value in the target apparatus.

According to another aspect of the present invention, in a target apparatus which stores at least one piece of domain key information in a first area and a plurality of pieces of content key information each associated with any one of the at least one piece of domain key information in a second area different from the first area, a method for detecting tampering of one of the plurality of pieces of content key information is provided. The method comprises a first calculation step of subjecting the one of the plurality of pieces of content key information to a first calculation to obtain check data, a first comparison step of comparing the check data obtained in the first calculation step with check data previously stored in the second area, an extraction step of extracting a plurality of pieces of check data associated with the plurality of pieces of content key information associated with one of the at least one piece of domain key information, without performing the first calculation, wherein the one of the at least one piece of domain key information is the same domain key information as that associated with the one of the plurality of pieces of content key information, a second calculation step of subjecting the plurality of pieces of check data extracted in the extraction step to the second calculation to obtain whole check data, and a second comparison step of comparing the whole check data obtained in the second calculation step with whole check data previously stored in the first area and associated with the same domain key information.

According to another aspect of the present invention, in a target apparatus which stores at least one piece of domain key information in an encrypted state and a plurality of pieces of content key information each associated with any one of the at least one piece of domain key information in an encrypted state, a method for detecting tampering of one of the plurality of pieces of content key information is provided. In the target apparatus, a whole check value encrypted using a chain encryption technique and a whole check value in plain text (hereinafter, plain text means "not encrypted") are previously stored. The method comprises a first calculation step of subjecting the one piece of the plurality of pieces of content key information to a first calculation to obtain check data, a first comparison step of comparing the check data obtained in the first calculation step with check data previously stored in the target apparatus, an extraction step of extracting a plurality of pieces of check data in an encrypted state and associated with the plurality of pieces of content key information associated with one of the at least one piece of domain key information, wherein the one of the at least one piece of domain key information is the same domain key information as that associated with the one of the plurality of pieces of content key information, a second calculation step of concatenating the plurality of pieces of check data in the encrypted state and the encrypted whole check value to obtain concatenated data, and decrypting the concatenated data to obtain the whole check value in plain text, and a second comparison step of comparing the whole check value in plain text obtained in the second calculation step with the whole check value in plain text previously stored.

According to another aspect of the present invention, in a target apparatus which stores at least one piece of domain key information and a plurality of pieces of content key information each associated with any one of the at least one piece of domain key information, a method for detecting tampering of one of the plurality of pieces of content key information is provided. Each of the plurality of pieces of content key information is encrypted using a chain encryption technique and is stored in the target apparatus. The method comprises a first calculation step of decrypting the one of the plurality of pieces of content key information and extracting data at a predetermined position to obtain a check value, a first comparison step of comparing the check value obtained in the first calculation step with a check value previously stored in the target apparatus, an extraction step of extracting a plurality of check values associated with the plurality of pieces of content key information associated with one of the at least one piece of domain key information, wherein the one of the at least one piece of domain key information is the same domain key information as that associated with the one of the plurality of pieces of content key information, a second calculation step of subjecting the plurality of check values extracted in the extraction step to a second calculation to obtain whole check data, and a second comparison step of comparing the whole check data obtained in the second calculation step with whole check data previously stored and associated with the same domain key information.

To check tampering of one content key, a tampering check is only performed with respect to the content key and check data (e.g., a hash value, a check value, etc.) for all content keys. Thereby, a processing amount is significantly reduced, so that a processing speed is increased.

Even if a content key is added or deleted by distribution via a network, check data does not need to be generated again for all content keys decrypted using the same domain key, and check data corresponding to the added content key and final check data corresponding to the check data may be only generated.

In general, an area whose security is maintained is a small area which is determined with respect to a memory area possessed by a target apparatus because for the purposes of implementation and convenience. Therefore, by storing only final check data in an area whose security is maintained, the area whose security is maintained preferably does not need to be large.

DESCRIPTION OF THE PREFERRED EMBODIMENTS

Figure 1:
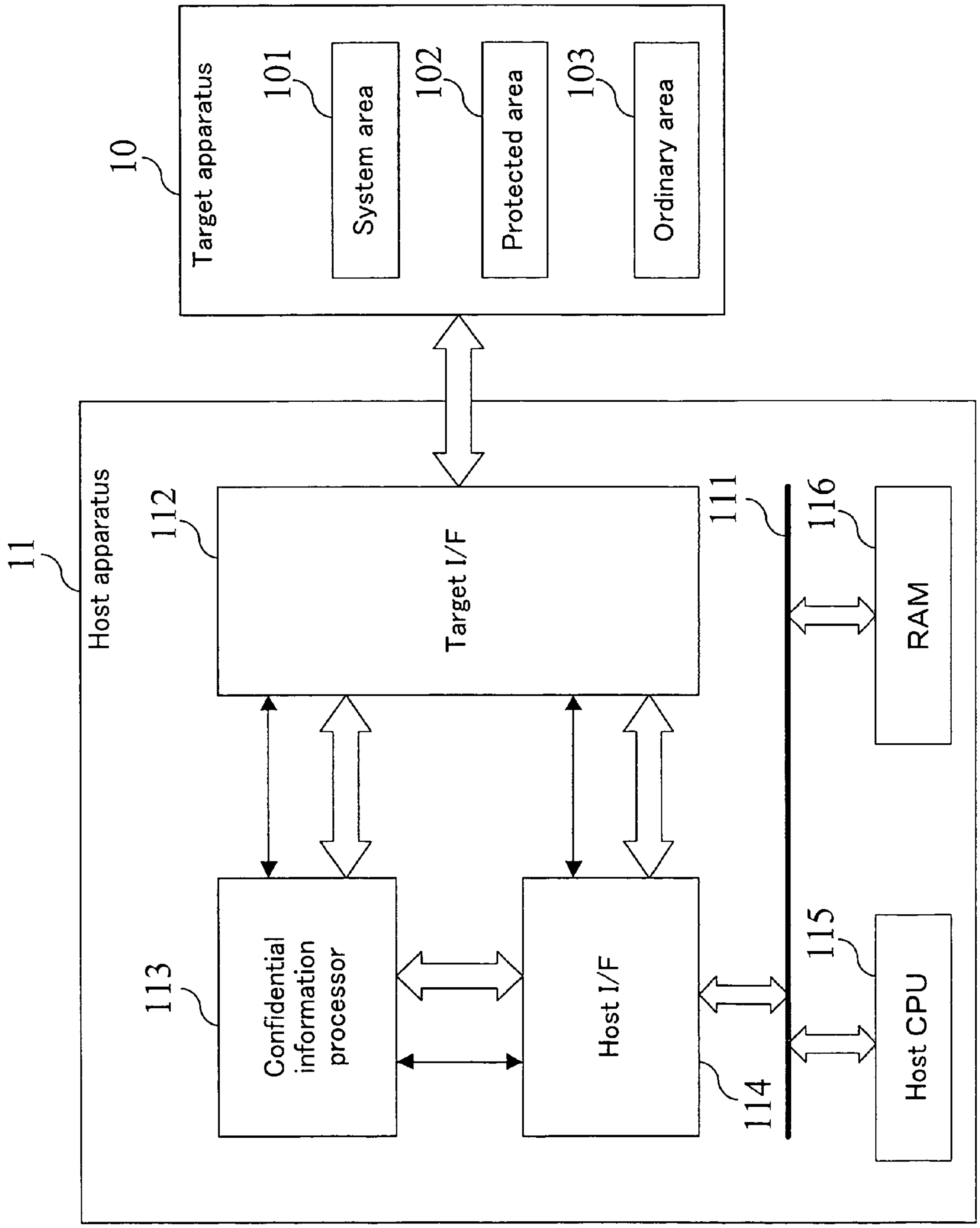
FIG. 1 is a diagram illustrating a whole structure of a confidential information processing system according to a first embodiment of the present invention.

Hereinafter, embodiments of the present invention will be described with reference to the accompanying drawings. The same reference numerals will be used throughout the drawings to refer to the same or like parts, which will not be repeatedly explained.

First Embodiment

<Whole Structure>

FIG. 1 illustrates a whole structure of a confidential information processing system according to a first embodiment of the present invention. The confidential information processing system comprises a target apparatus 10 and a host apparatus 11. The target apparatus 10 is a storage medium, such as, for example, a memory card represented by an SD card, which stores data including confidential information. The host apparatus 11 is connected to the target apparatus 10, and reads/writes confidential information from/to the target apparatus 10.

<Storage Area of Target Apparatus>

A storage area of the target apparatus 10 includes a system area 101, a protected area 102, and an ordinary area 103. In the system area 101, information (e.g., an authentication key) for performing authentication between the target apparatus 10 and the host apparatus 11 is stored. The host apparatus 11 can access the system area 101 in only a predetermined process in which an access to the system area 101 is permitted. The protected area 102 is an area which cannot be arbitrarily accessed by the user, and can be accessed only after authentication is successful. The ordinary area 103 is an area which can be arbitrarily accessed by the user. In the protected area 102, an encrypted domain key is stored. In the ordinary area 103, an encrypted content key and an encrypted content are stored.

<Internal Structure of Host Apparatus>

The host apparatus 11 comprises an internal bus 111, a target I/F 112, a confidential information processor 113, a host I/F 114, a host CPU 115, and a RAM 116. The target I/F 112 is an interface through which data is sent/received to/from the target apparatus 10. The confidential information processor 113 performs authentication with the target apparatus 10 in accordance with a predetermined sequence. The confidential information processor 113 also encrypts/decrypts confidential information stored in the target apparatus 10. The host I/F 114 is an interface through which data is sent/received to/from the target I/F 112, the confidential information processor 113, and the host CPU 115. The host CPU 115 causes the confidential information processor 113 to perform the predetermined sequence. The RAM 116 is used as a working area for temporarily storing data which is used in the host CPU 115 or the confidential information processor 113.

Before confidential information is read/written between the target apparatus 10 and the host apparatus 11, authentication needs to be performed between the target apparatus 10 and the host apparatus 11. In this case, the host CPU 115 activates the confidential information processor 113, which in turn performs an authentication process. If the authentication is successful, the host apparatus 11 reads confidential information from the target apparatus 10 via the target I/F 112, and the confidential information processor 113 decrypts the confidential information.

The host CPU 115 also activates an operation of the confidential information processor 113. The confidential information processor 113 is hardware which is kept confidential. When activated by the host CPU 115, the confidential information processor 113 performs only a predetermined sequence whose security is protected or is less required.

<Flow of Whole Process>

Next, referring to FIG. 2, a description will be given of how the host apparatus 11 decrypts an encrypted content stored in the target apparatus 10.

(Step ST11)

When the target apparatus 10 is connected to the host apparatus 11, the host apparatus 11 reads an authentication key stored in the target apparatus 10.

(Step ST12)

Next, the host apparatus 11 performs an authentication process using the authentication key read from the target apparatus 10 and a host authentication key possessed by itself.

(Step ST13)

As a result of the authentication process, when the authentication fails, the host apparatus 11 determines that the access is an unauthorized access and aborts the process (abnormal end). On the other hand, when the host apparatus 11 passes the authentication, the process goes to step ST14.

(Step ST14)

Next, the host apparatus 11 generates an intermediate authentication key based on the authentication key read from the target apparatus 10 and the host authentication key possessed by itself. The intermediate authentication key thus generated is stored in an intermediate authentication key storage area of the confidential information processor 113. Thereby, the target apparatus 10 and the host apparatus 11 are now ready to communicate with each other in the subsequent steps.

(Step ST15)

Next, the host apparatus 11 determines whether or not decryption of encrypted an content stored in the target apparatus 10 is requested by the user or the like. When there is such a request, the process goes to step ST16.

(Step ST16)

Next, the host apparatus 11 reads out, from the target apparatus 10, confidential information (an encrypted content key, an encrypted domain key, and information accompanying them) which is required for decryption of the encrypted content. Specifically, the host apparatus 11 extracts a content ID from the information accompanying the encrypted contents, and based on the content ID, specifies a content key required for decryption of the encrypted content. A correspondence relationship between content IDs and content keys is previously prepared as a table. Next, the host apparatus 11 specifies a required domain key by referencing a key correspondence table stored in the ordinary area 103 of the target apparatus based on the specified content key. When the content key and the domain key have been specified, required key information is read out.

(Step ST17)

Next, the host apparatus 11 reads out an encrypted domain key stored in the protected area 102 of the target apparatus 10. Next, the host apparatus 11 uses the intermediate authentication key generated in step ST14 to decrypt the encrypted domain key. Thereby, a domain key in plain text is generated.

(Step ST18)

Next, the host apparatus 11 reads out an encrypted content key stored in the ordinary area 103 of the target apparatus 10. Next, the host apparatus 11 performs a tampering check with respect to the encrypted content key.

(Step ST19)

When tampering is found in the encrypted content key, the host apparatus 11 determines that the access is an unauthorized access and aborts the process (abnormal end). On the other hand, when tampering is not found in the encrypted content key, the process goes to step ST20.

(Step ST20)

Next, the host apparatus 11 uses the domain key generated in step ST17 to decrypt the encrypted content key. Thereby, the host apparatus 11 obtains the content key in plain text.

(Step ST21)

Next, the host apparatus 11 uses the content key in plain text obtained in step ST20 to decrypt the encrypted content. Thereby, the content can be put to use.

<Confidential Information>

Next, confidential information stored in the target apparatus 10 will be described with reference to FIG. 3. In the protected area 102, a domain key group UKURE is stored. In the ordinary area 103, a key correspondence table Address List, a content key group TKURE(i), and a hash list Hash List(i) are stored.

(Domain Key Group)

The domain key group UKURE includes n encrypted domain keys EncKu(1) to EncKu(n) (n is an integer of 1 or more) and n pieces of encrypted domain key management information EncUR[u](1) to EncUR[u](n).

Figure 4:
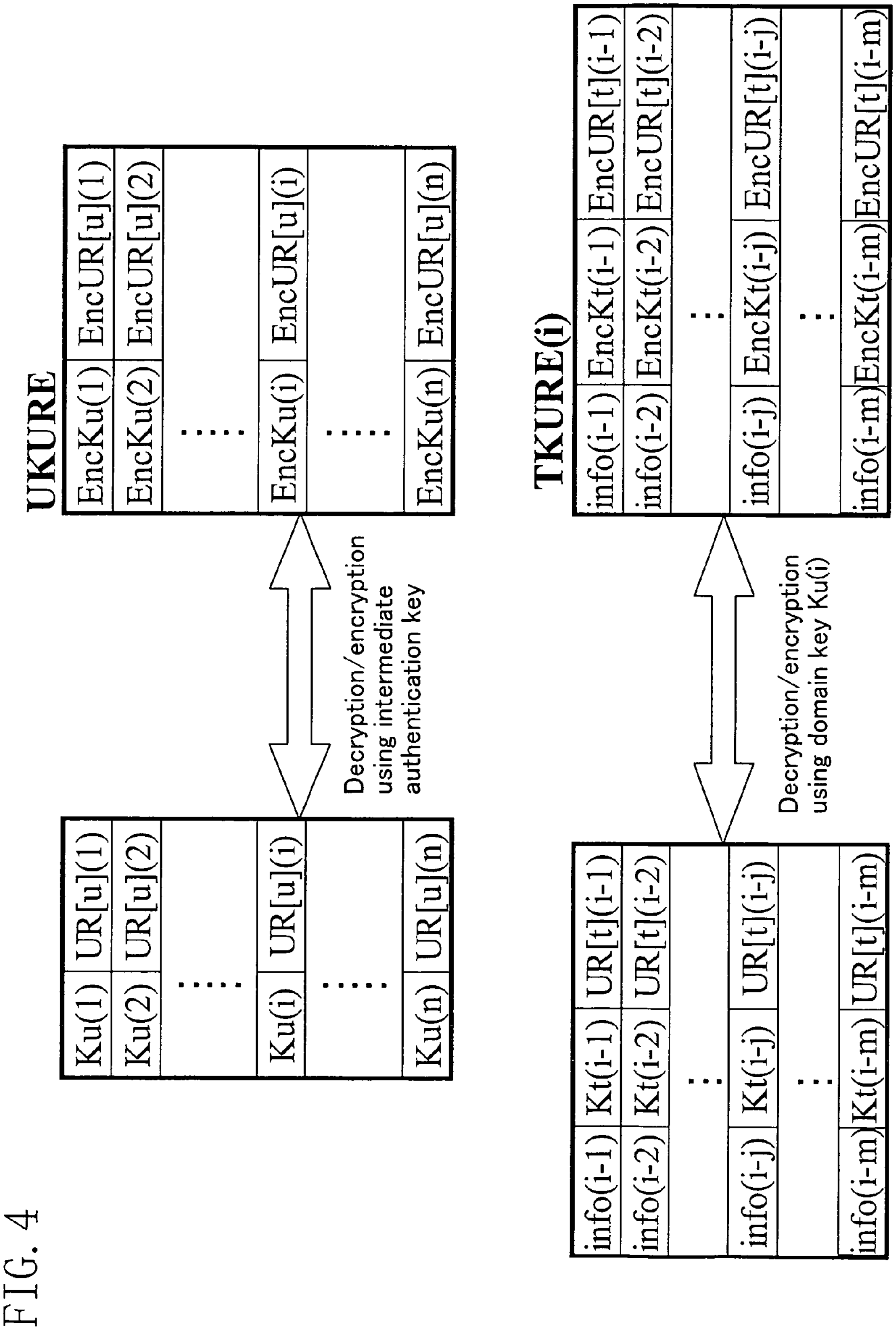
FIG. 4 is a diagram for explaining encryption/decryption of a domain key and encryption/decryption of a content key.

The encrypted domain keys EncKu(1) to EncKu(n) are associated with respective encrypted content keys (one content key group). As illustrated in FIG. 4, the encrypted domain keys EncKu(1) to EncKu(n) are decrypted using an intermediate authentication key into the domain keys Ku(1) to Ku(n). Each of the domain keys Ku(1) to Ku(n) is used to encrypt/decrypt a plurality of content keys associated therewith. In other words, one domain key can be used to encrypt/decrypt a plurality of content keys.

The encrypted domain key management information EncUR[u](1) to EncUR[u](n) are in one-to-one correspondence with the encrypted domain keys EncKu(1) to EncKu(n). As illustrated in FIG. 4, the encrypted domain key management information EncUR[u](1) to EncUR[u](n) are decrypted using an intermediate authentication key into domain key management information UR[u](1) to UR[u](n). In addition, as illustrated in FIG. 3, a concatenated hash value is stored at a predetermined position in each of the encrypted domain key management information EncUR[u](1) to EncUR[u](n). The concatenated hash value is generated based on a content key group corresponding to the encrypted domain key management information. For example, a concatenated hash value Hash(i) is stored at a predetermined position in i-th encrypted domain key management information EncUR[u](i) (i is an integer and $1 \leqq i \leqq n$) of the encrypted domain key management information EncUR[u](1) to EncUR[u](n). The concatenated hash value Hash(i) is generated based on the content key group TKURE(i).

Figure 3:
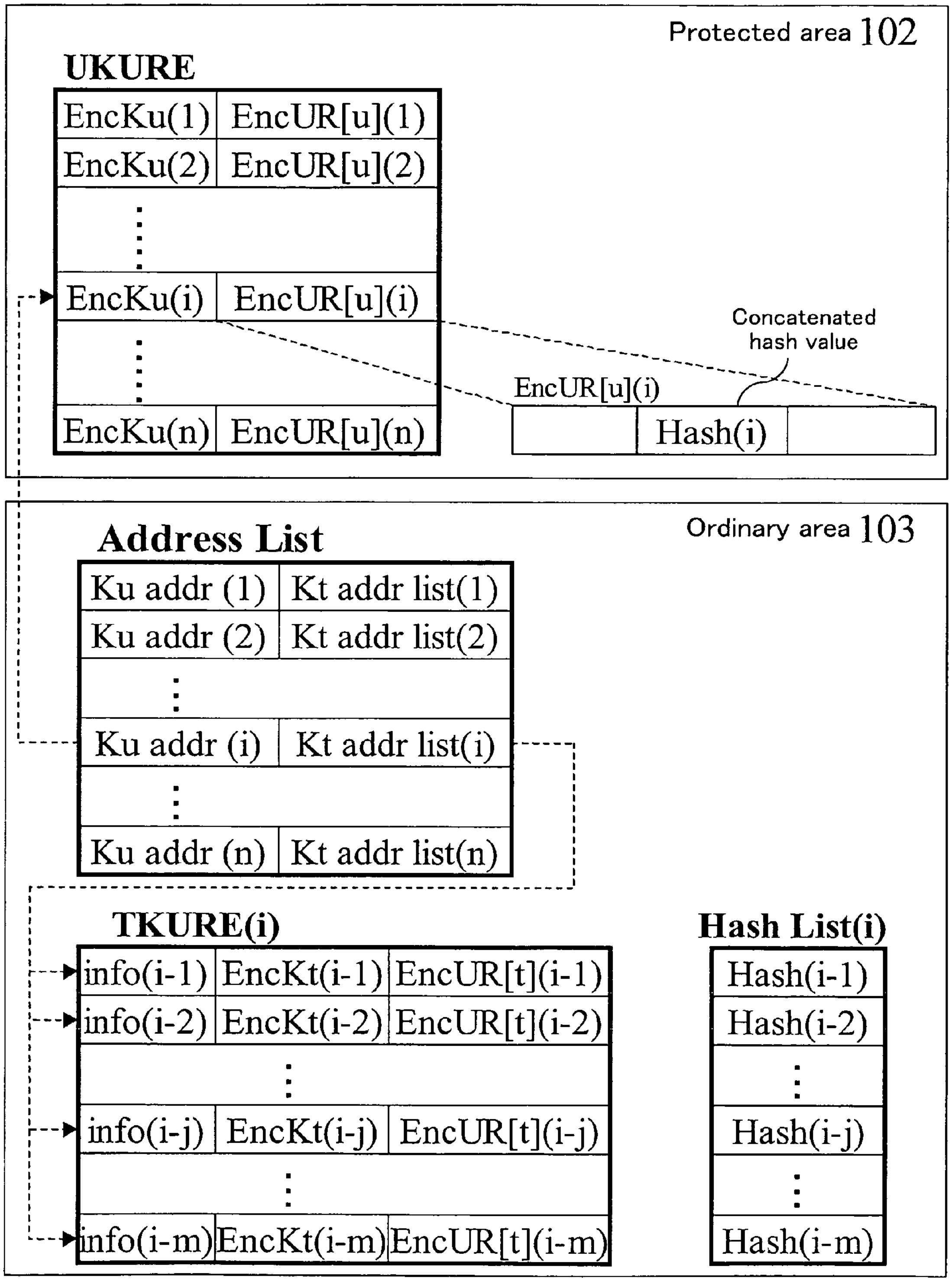
FIG. 3 is a diagram illustrating confidential information stored in a target apparatus in the first embodiment of the present invention.

Although FIG. 3 illustrates only the content key group TKURE(i) corresponding to the encrypted domain key EncKu(i), the encrypted domain key EncKu(1) to EncKu(n) other than the encrypted domain key EncKu(i) may be in one-to-one correspondence with content key groups.

(Content Key Group)

The content key group TKURE(i) is a set of a content key(s) which can be encrypted/decrypted using the domain key Ku(i) and information accompanying the content key. The content key group TKURE(i) includes m encrypted content keys EncKt(i-1) to EncKt(i-m) (m is an integer of 1 or more), m pieces of encrypted content key management information EncUR[t](i-1) to EncUR[t](i-m), and m pieces of additional information info(i-1) to info(i-m).

As illustrated in FIG. 4, the encrypted content keys EncKt (i-1) to EncKt(i-m) are decrypted using the domain key Ku(i) into the content keys Kt(i-1) to Kt(i-m). The content keys Kt(i-1) to Kt(i-m) are used to encrypt/decrypt respective corresponding contents (not shown).

The content key management information UR[t](i-1) to UR[t](i-m) are in one-to-one correspondence with the content keys Kt(i-1) to Kt(i-m). As illustrated in FIG. 4, the encrypted content key management information EncUR[t](i-1) to EncUR[t](i-m) are decrypted using the domain key Ku(i) into the content key management information UR[t](i-1) to UR[t] (i-m).

The additional information info(i-1) to info(i-m) are in one-to-one correspondence with the encrypted content key EncKt(i-1) to EncKt(i-m).

(Key Correspondence Table)

On the key correspondence table Address List, addresses Ku addr(1) to Ku addr(n) of the n encrypted domain key are associated with n content key tables Kt addr list(1) to Kt addr list(n). Each content key table corresponds to any one of the content key tables. In each content key table, addresses of encrypted content keys included in a corresponding content key group are written. For example, by referencing the content key table Kt addr list(i) corresponding to the address Ku addr (i) of the domain key Ku(i), the content key group TKURE(i) (specifically, the encrypted content keys EncKt(i-1) to EncKt(i-m)) corresponding to the domain key Ku(i) can be retrieved. Thus, by referencing a key management table Address List, it is possible to quickly search a correspondence relationship between domain keys and content keys.

(Hash List)

The hash list Hash List(i) corresponds to the content key group TKURE(i). The hash list Hash List(i) also includes m hash values Hash(i-1) to Hash(i-m). The hash values Hash(i-1) to Hash(i-m) are in one-to-one correspondence with the encrypted content keys EncKt(i-1) to EncKt(i-m). Although FIG. 3 illustrates only the hash list Hash List(i) corresponding to the content key group TKURE(i), other hash lists corresponding to content key groups (not shown) may be present in addition to the content key group TKURE(i).

<Procedure of Generating Hash List>

Figure 5:
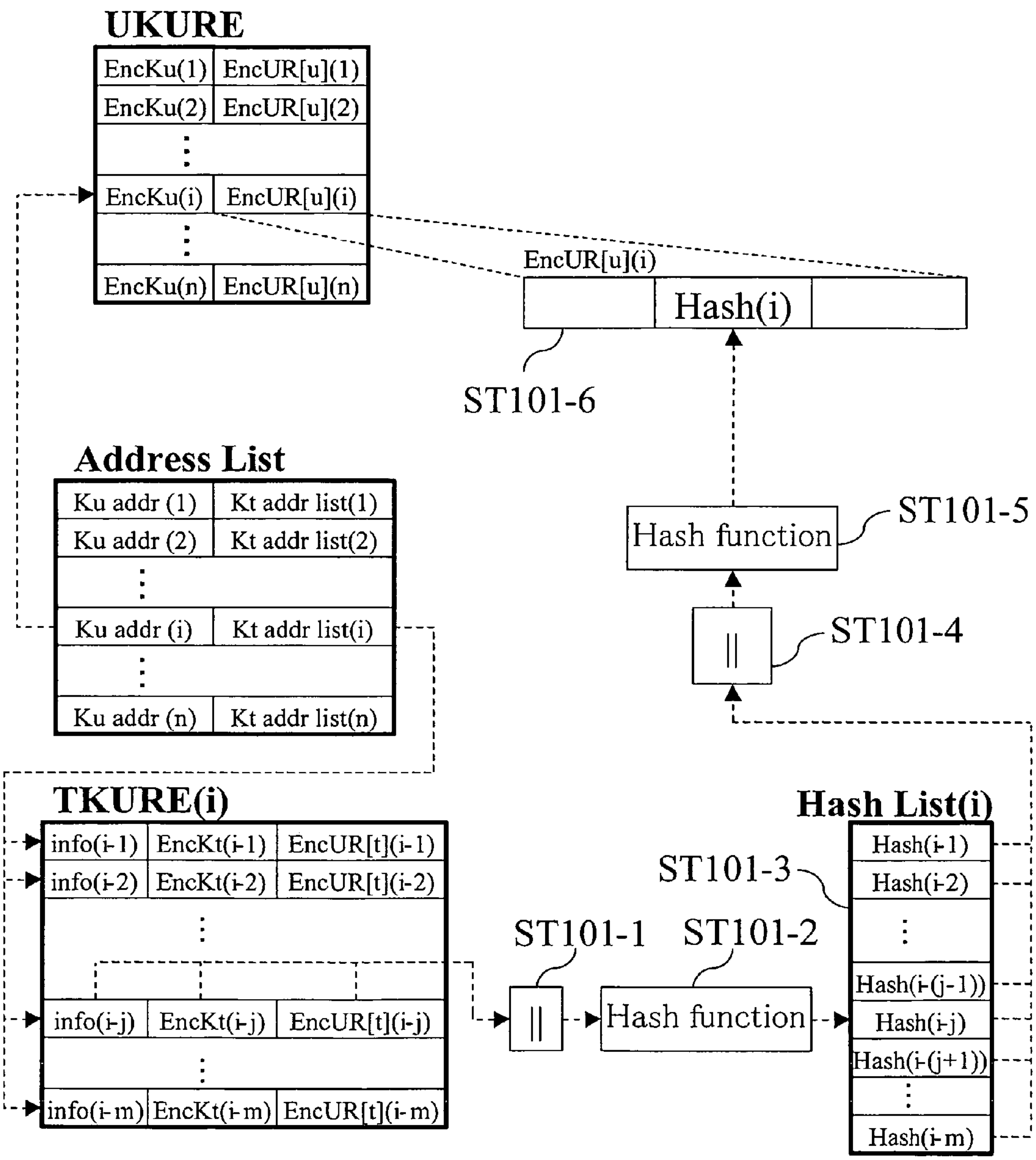
FIG. 5 is a diagram for explaining a procedure of generating a hash list and a concatenated hash value illustrated in FIG. 6.

Next, a procedure of generating the hash list Hash List(i) of FIG. 3 will be described with reference to FIG. 5.

(Step ST101-1)

The encrypted content key EncKt(i-1), the additional information info(i-1) in plain text, and the encrypted content key management information EncUR[t](i-1) are concatenated together. Similarly, each of the encrypted content keysEncKt (i-2) to EncKt(i-m) is concatenated together with additional information and encrypted content key management information which accompany the encrypted content key. Thereby, m pieces of concatenated data are generated.

(Step ST101-2)

Next, a hash calculation is performed with respect to concatenated data corresponding to the encrypted content key EncKt(i-1). Thereby, a hash value Hash(i-1) is calculated. Concatenated data corresponding to each of the encrypted content keys EncKt(i-2) to EncKt(i-m) is similarly subjected to a hash calculation. As a result, m hash values Hash(i-1) to Hash(i-m) are calculated.

(Step ST101-3)

Next, the m calculated hash values Hash(i-1) to Hash(i-m) are collected on a single list. Thereby, the hash list Hash List(i) corresponding to the content key group TKURE(i) is completed.

<Procedure of Generating Concatenated Hash Value>

Next, a procedure of generating the concatenated hash value Hash(i) of FIG. 3 will be described with reference to FIG. 5.

(Step ST101-4)

The m hash values Hash(i-1) to Hash(i-m) present on the hash list Hash List(i) are concatenated together. Thereby, one piece of hash concatenated data is generated.

(Step ST101-5)

Next, a hash calculation is performed with respect to the hash concatenated data generated in step ST101-4. Thereby, the concatenated hash value Hash(i) is calculated.

(Step ST101-6)

Next, the concatenated hash value Hash(i) calculated in step ST101-5 is stored at a predetermined position in the encrypted domain key management information EncUR[u](i). The encrypted domain key management information EncUR[u](i) corresponds to the hash list Hash List(i).

When an existing domain key is used to update, add, or delete a content key so that the encrypted domain key management information EncUR[u](i) is updated, the encrypted domain key management information EncUR[u](i) is temporarily decrypted into the domain key management information UR[u](i) before storing the concatenated hash value Hash(i). Thereafter, when the concatenated hash value Hash (i) is stored in the domain key management information UR[u](i), the domain key management information UR[u](i) is encrypted back to the encrypted domain key management information EncUR[u](i).

Note that, when a domain key is newly produced, the domain key management information UR[u](i) is also newly produced. In this case, the temporary decryption is no longer required, and the concatenated hash value Hash(i) is stored into the domain key management information UR[u](i), the domain key management information UR[u](i) is encrypted to produce the encrypted domain key management information EncUR[u](i).

<Tampering Check of Content Key>

Figure 6:
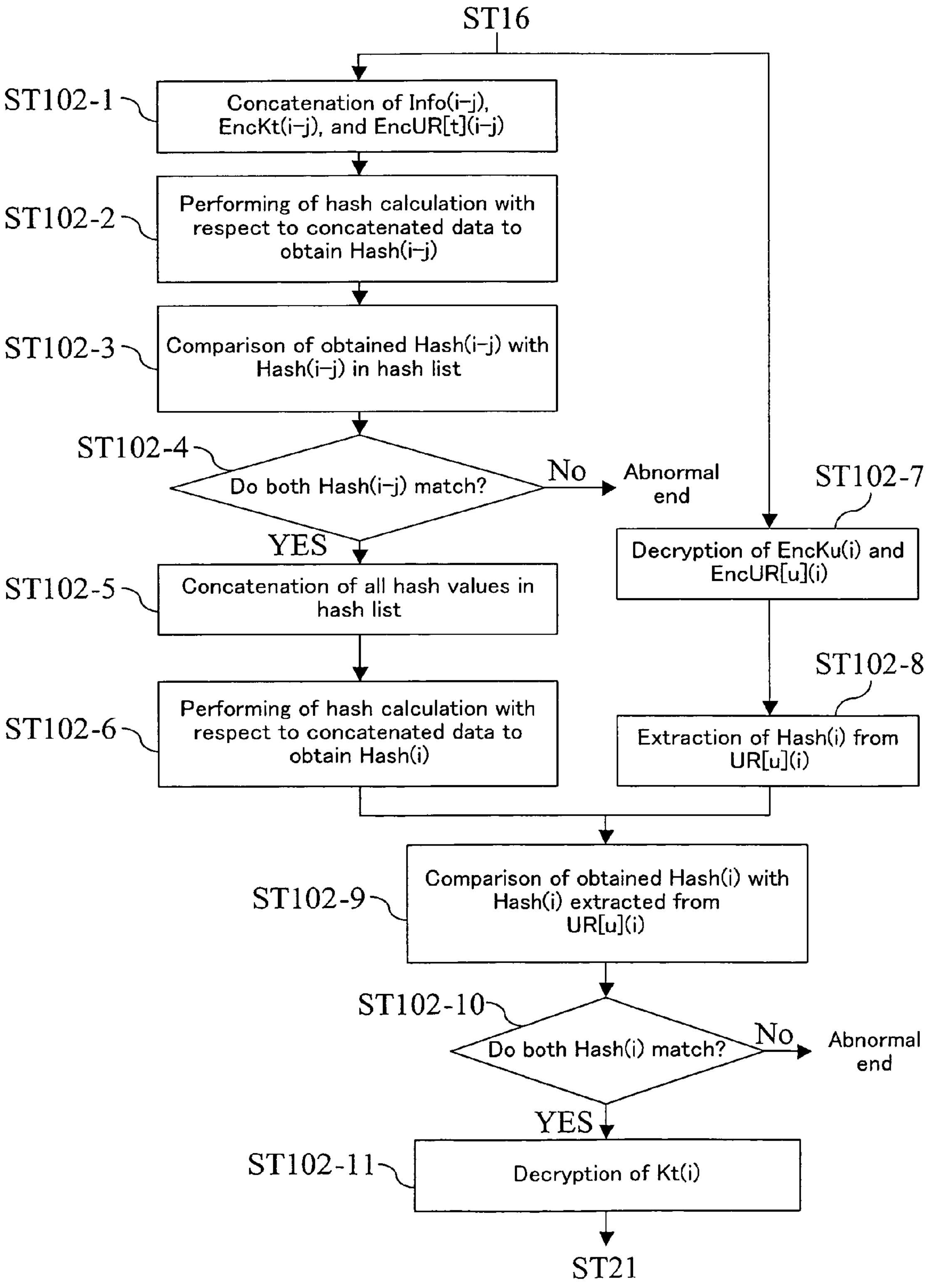
FIG. 6 is a flowchart illustrating a tampering check method according to the first embodiment of the present invention.

Next, referring to FIG. 6, a description will be given of how the host apparatus 11 checks tampering of a content key stored in the target apparatus 10 (a process in step ST22). It is now assumed that the host apparatus 11 checks tampering of the j-th content key Kt(i-j) (j is an integer and 1≦j≦m) of the content keys Kt(i-1) to Kt(i-m) corresponding to the domain key Ku(i).

(Step ST102-1)

Next, the host apparatus 11 concatenates the encrypted content key EncKt(i-j) with the additional information info (i-j) in plain text and the encrypted content key management information EncUR[t](i-j) which accompany the encrypted content key EncKt(i-j). Thereby, one piece of concatenated data is generated.

(Step ST102-2)

Next, the host apparatus 11 performs a hash calculation with respect to the concatenated data generated in step ST102-1 to obtain a hash value Hash(i-j).

(Step ST102-3)

Next, the host apparatus 11 compares the hash value Hash (i-j) calculated in step ST102-2 with the hash value Hash(i-j) on the hash list Hash List(i) stored in the ordinary area 103 of the target apparatus 10.

(Step ST102-4)

When, as a result of the comparison in step ST102-3, it is determined that the hash value Hash(i-j) calculated in step ST102-2 does not match the hash value Hash(i-j) of the hash list Hash List(i), the host apparatus 11 determines that the encrypted content key EncKt(i-j), the additional information info(i-j), or the encrypted content key management information EncUR[t](i-j) is tampered, and aborts the process (abnormal end). On the other hand, when it is determined that these hash values Hash(i-j) match, the process goes to step ST102-5.

(Step ST102-5)

Next, the host apparatus 11 obtains (m-1) hash values Hash(i-1) to Hash(i-(j−1)) and Hash(i-(j+1)) to Hash(i-m) from the hash list Hash List(i) stored in the target apparatus 10, excluding the hash value Hash(i-j) corresponding to the content key Kt(i-j). In other words, the host apparatus 11 does not perform a hash calculation with respect to (m-1) encrypted content keys of the encrypted content keys EncKt (i-1) to EncKt(i-m) corresponding to the encrypted domain key EncKu(i), excluding the encrypted content key EncKt(i-j). Next, the host apparatus 11 buries the hash value Hash(i-j) calculated in step ST102-2 between the hash value Hash(i-(j−1)) located immediately before the hash value Hash(i-j) and the hash value Hash(i-(j+1)) immediately after the hash value Hash(i-j). Thereafter, the host apparatus 11 concatenates the hash values Hash(i-1) to Hash(i-(j−1)), Hash(i-j), and Hash(i-(j+1)) to Hash(i-m) together. Thereby, hash concatenated data is generated. In other words, in the hash concatenated data, the hash value Hash(i-j) of the m hash values Hash(i-1) to Hash(i-m) present on the hash list Hash List(i) is replaced with the hash value Hash(i-j) calculated in step ST102-2.

(Step ST102-6)

Next, the host apparatus 11 further performs a hash calculation with respect to the hash concatenated data generated in step ST102-5 to calculate a concatenated hash value Hash(i). Next, the process goes to step ST102-9. Note that the hash value Hash(i-j) does not necessarily need to be replaced. Authenticity has been checked by comparison of the hash value Hash(i-j) with a hash value on the hash list Hash List(i), and therefore, the hash list Hash List(i) may be subjected as it is to a hash calculation to obtain a concatenated hash value Hash(i).

(Step ST102-7)

On the other hand, the host apparatus 11 detects the encrypted domain key EncKu(i) required for decryption of the encrypted content key EncKt(i-j) by referencing the key correspondence table Address List. Thereafter, the host apparatus 11 uses an intermediate authentication key to decrypt the detected encrypted domain key EncKu(i) and the encrypted domain key management information EncUR[u] (i). Thereby, the domain key Ku(i) and the domain key management information UR[u](i) are generated.

(Step ST102-8)

Next, the host apparatus 11 extracts the concatenated hash value Hash(i) which is stored at a predetermined bit position in the domain key management information UR[u](i). Next, the process goes to step ST102-9.

(Step ST102-9)

Next, the host apparatus 11 compares the concatenated hash value Hash(i) calculated in step ST102-6 with the concatenated hash value Hash(i) extracted in step ST102-8.

(Step ST102-10)

When, as a result of the comparison in step ST102-9, it is determined that the concatenated hash value Hash(i) calculated in step ST102-6 does not match the concatenated hash value Hash(i) extracted in step ST102-8, the host apparatus 11 determines that the encrypted content key EncKt(i-j), the additional information info(i-j), or the encrypted content key management information EncUR[t](i-j) is tampered and aborts the process (abnormal end). On the other hand, when it is determined that both the concatenated hash values Hash(i) match, the process goes to step ST102-11.

(Step ST102-11)

Next, assuming that the authenticity of the content key is certified, the host apparatus 11 uses the domain key Ku(i) generated in step ST102-7 to decrypt the encrypted content key EncKt(i-j) and the encrypted content key management information EncUR[t](i-j). Thereby, the host apparatus 11 obtains the content key Kt(i-j) in plain text and the content key management information UR[t](i-j) in plain text.

The host apparatus 11 uses the thus-obtained content key Kt(i-j) in plain text to decrypt encrypted contents.

Figure 19:
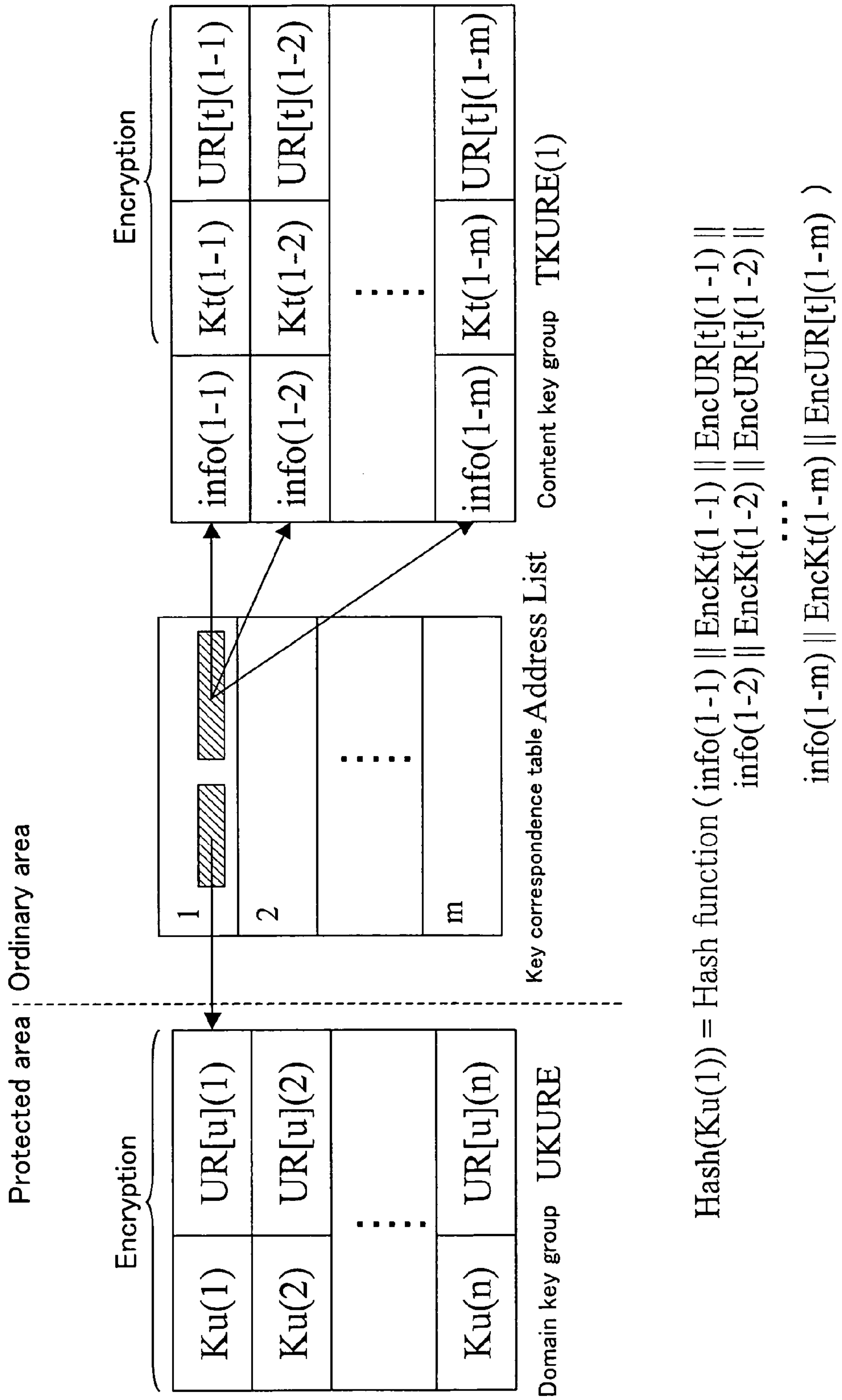
FIG. 19 is a diagram illustrating the confidential information stored in the target apparatus of FIG. 18 in greater details.

As described above, in the first embodiment, when a tampering check is performed with respect to one content key, a hash calculation is performed with respect to concatenated data including one encrypted content key and information accompanying it, and a hash calculation is performed with respect to concatenated data including a hash value present on a hash list. According to the tampering check method, the processing amount can be significantly reduced, so that the processing speed can be increased, as compared to the tampering check method of FIG. 19.

It is considered that a content key will be added or deleted by distribution via a network in the future. In the first embodiment, when a content key is added, a hash calculation may be performed with respected to the added content key to obtain a hash value and the obtained hash value may be added to a hash list (steps ST101-1 to ST101-3 are performed), thereby making it possible to update the hash list. Also, a hash calculation may be performed with respect to concatenated data including a plurality of hash values present on the updated hash list (steps ST101-4 and ST101-5 are performed), thereby making it possible to update the concatenated hash value. On the other hand, when a content key is deleted, a hash value corresponding to the deleted content key may be deleted from the hash list, thereby making it possible to update the hash list. Further, a hash calculation may be performed with respect to concatenated data including a plurality of hash value present on the updated hash list (steps ST101-4 and ST101-5 are performed), thereby making it possible to update the concatenated hash value.

<Entry>

In some target apparatuses, an area for storing a content key is reserved in the form of an entry. Each entry is associated with any one of a plurality of domain keys. In other words, each domain key is associated with a plurality of entries. An encrypted content key stored in an entry can be decrypted using a domain key associated with the entry. In this case, a concept of hash list that hash values corresponding to entries are collected emerges. Specifically, no matter whether a content key is actually stored, hash values of all entries associated with the same domain key may be stored as a hash list in the ordinary area 103. Alternatively, hash values of all entries associated with the same domain key may be concatenated together, the resultant concatenated data may be subjected to a hash calculation to obtain a hash value, and the obtained hash value may be stored into domain key management information. To reduce the processing amount, it is preferable that the amount of the hash calculation be small. Therefore, in a preferable method, only entries in which a content key is actually stored are subjected to a hash calculation to generate a hash list, hash values on the hash list are concatenated together and the result is subjected to a hash calculation to obtain a hash value, and this hash value is stored in domain key management information.

<Variations>

Various variations of the first embodiment of the present invention are conceived. Hereinafter, for example, three representative variations will be disclosed.

(1) Encrypted contents do not necessarily need to be stored in the same target apparatus as that in which an encrypted content key is stored, and may be stored in another recording medium. In this case, a host apparatus obtains encrypted contents which are stored in the other recording medium via a network or the like, and decrypts the encrypted contents using a content key whose authenticity is certified by the tampering check method of the first embodiment.

(2) Additional information is information which is not encrypted and whose confidentiality level is relatively low, and therefore, may not be subjected to a hash calculation. For example, the hash value Hash(i-j) may be calculated by performing a hash calculation with respect to concatenated data including the encrypted content key EncKt(i-j) and the encrypted content key management information EncUR[t](i-j).

Figure 7:
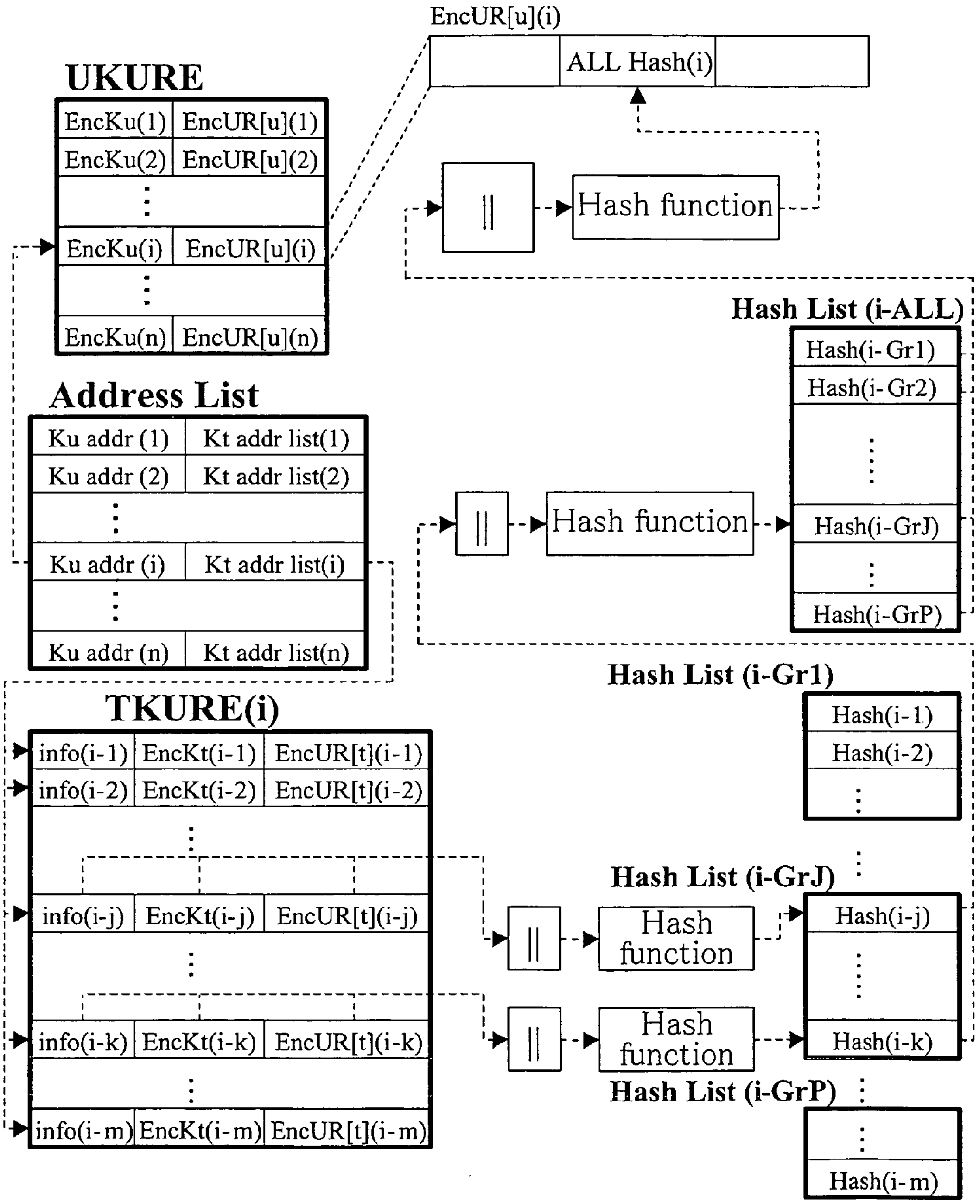
FIG. 7 is a diagram for explaining a variation of the first embodiment of the present invention.

(3) In the first embodiment, one hash list Hash List(i) is provided with respect to a set of content keys which are decrypted using the same domain key (the content key group TKURE(i)). Alternatively, for one content key group, P subset hash lists (P is an integer of 2 or more) and one whole-set hash list can be provided. Hereinafter, the subset hash list and the whole-set hash list will be described with reference to FIG. 7, where the content key group TKURE(i) is illustrated. Here, a plurality of encrypted content keys (m encrypted content keys EncKt(i-1) to EncKt(i-m) included in the content key group TKURE(i)) which can be decrypted using the domain key Ku(i) are divided into P subsets (P is an integer of 2 or more). The P subsets are in one-to-one correspondence with P subset hash lists Hash List(i-Gr1) to Hash List(i-GrP). For example, a subset including from the j-th content key Kt(i-j) to the k-th content key Kt(i-K) (k is an integer and $j<k\leqq m$) are associated with the subset hash list Hash List (i-GrJ) (J is an integer and $1\leqq J\leqq P$). The subset hash list Hash List(i-GrJ) includes (k-j) hash values Hash(i-j) to Hash(i-k). The subset hash lists Hash List(i-Gr1) to Hash List(i-GrP) are associated with a whole-set hash list Hash List(i-ALL). The whole-set hash list Hash List(i-ALL) includes P partial hash values Hash(i-Gr1) to Hash(i-GrP) which are in one-to-one correspondence with the P subset hash lists Hash List(i-Gr1) to Hash List(i-GrP). A whole hash value ALL Hash(i) is generated based on the whole hash list Hash List(i-ALL). With such a structure, when a tampering check is performed with respect to the encrypted content key EncKt(i-j), a hash calculation (hash calculation 1) is performed with respect to concatenated data including the encrypted content key EncKt (i-j), the encrypted content key management information EncUR[t](i-j), and the additional information info(i-j); a hash calculation (hash calculation 2) is performed with respect to the subset hash list Hash List(i-GrJ) corresponding to a subset to which the content key Kt(i-j) belongs; and a hash calculation (hash calculation 3) is performed with respect to the whole-set hash list Hash List(i-ALL). The sum of processing amounts of the hash calculation 2 and the hash calculation 3 is smaller than the processing amount of the process of FIG. 5. Therefore, a higher processing speed can be expected.

Second Embodiment

In a second embodiment of the present invention, a content key and content key management information are encrypted using a chain encryption technique.

<Chain Encryption Technique>

Figure 8:
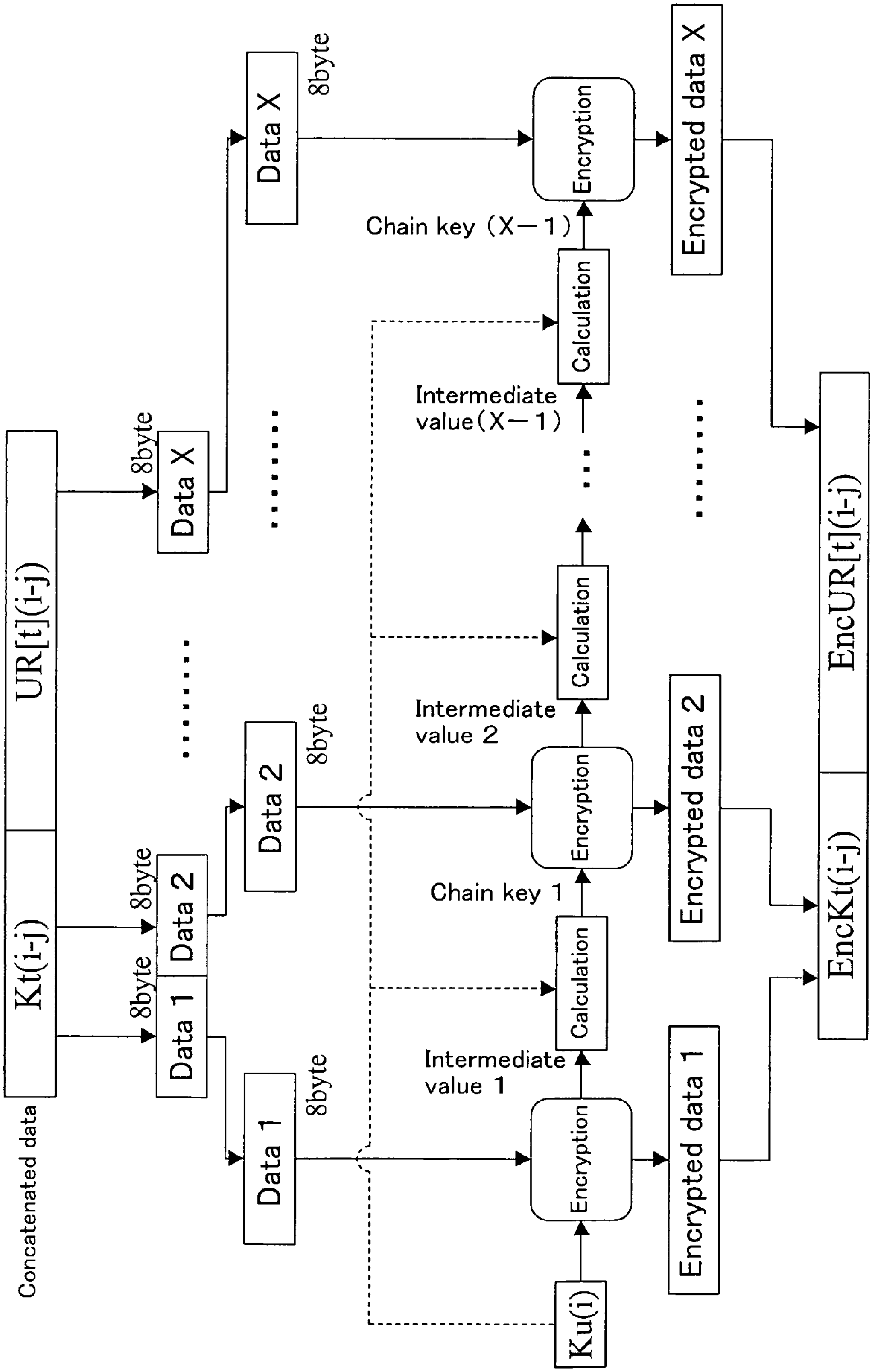
FIG. 8 is a diagram for explaining a chain encryption technique.

Hereinafter, an encrypted method using the chain encryption technique (Cipher Block Chaining) will be described with reference to FIG. 8. Note that it is here assumed that the content key Kt(i-j) and the content key management information UR[t](i-j) are subjected to encryption.

(Encryption)

The content key Kt(i-j) and the content key management information UR[t](i-j) are concatenated together, and the resultant concatenated data is divided into 8-byte units from the head thereof. The 8-byte data are referred to as "data 1", "data 2", . . . , and "data X" (X is an integer of 2 or more). Note that the division unit is not limited to 8 bytes and may take any value.

Next, "data 1", which is the first 8 bytes from the MSB (Most significant bit or Most Significant Byte), is encrypted using the domain key Ku(i) into "encrypted data 1". Next, a predetermined calculation is performed with respect to an intermediate value 1 of the encryption of "data 1" to generate a chain key 1. Next, "data 2" located immediately after "data 1" is encrypted using the chain key 1 into "encrypted data 2". Next, a predetermined Calculation is performed with respect to an intermediate value 2 of the encryption of "data 2" to generate a chain key 2. Thus, "data 1", which is the first 8 bytes, is encrypted using the domain key Ku(i), and the second and more 8-byte data are successively encrypted using a result of the encryption of the respective previous 8-byte data.

The above-described encryption process is repeatedly performed until "data X", which is the final 8 bytes (i.e., LSB (Least Significant Bit or Least Significant Byte)) when counted from the MSB. As a result, "data 1" to "data X" are changed to "encrypted data 1" to "encrypted data X". A set of "encrypted data 1" to "encrypted data X" is a set of the encrypted content key EncKt(i-j) and the encrypted content key management information EncUR[t](i-j).

(Decryption)

Next, a decrypting method using the chain encryption technique will be described.

A set of the encrypted content key EncKt(i-j) and the encrypted content key management information EncUR[t](i-j) is divided into 8-byte units from the head thereof. The resultant 8-byte data are referred to as "encrypted data 1", "encrypted data 2", . . . , and "encrypted data X". Next, "encrypted data 1" is decrypted using the domain key Ku(i) into "data 1". Next, "encrypted data 2" is decrypted using a result of the decryption of "encrypted data 1" into "data 2". Thus, "encrypted data 1", which is the first 8 bytes, is decrypted using the domain key Ku(i), and the second and more 8-byte data are successively decrypted using a result of the decryption of the respective previous 8-byte data.

In such a chain encryption technique, portions of data (each 8-byte data) are encrypted/decrypt in a chained manner. Therefore, the chain encryption technique has a feature such that, when decryption fails at some point, none of encrypted data after that point is normally decrypted. Therefore, for example, if decryption is successful for "encrypted data X", which is the final 8 bytes (LSB), it is certified that all data is authentic.

The chain encryption technique also has a feature such that, even when the same data is encrypted, different results of encryption are obtained if the previously encrypted data are different from each other.

<Structure>

In view of the above description, a confidential information processing system according to the second embodiment of the present invention will be described. A confidential information processing system of the second embodiment has a whole structure similar to that of FIG. 1. Note that confidential information stored in the target apparatus 10 is different from that of FIG. 3.

<Confidential Information>

Figure 9:
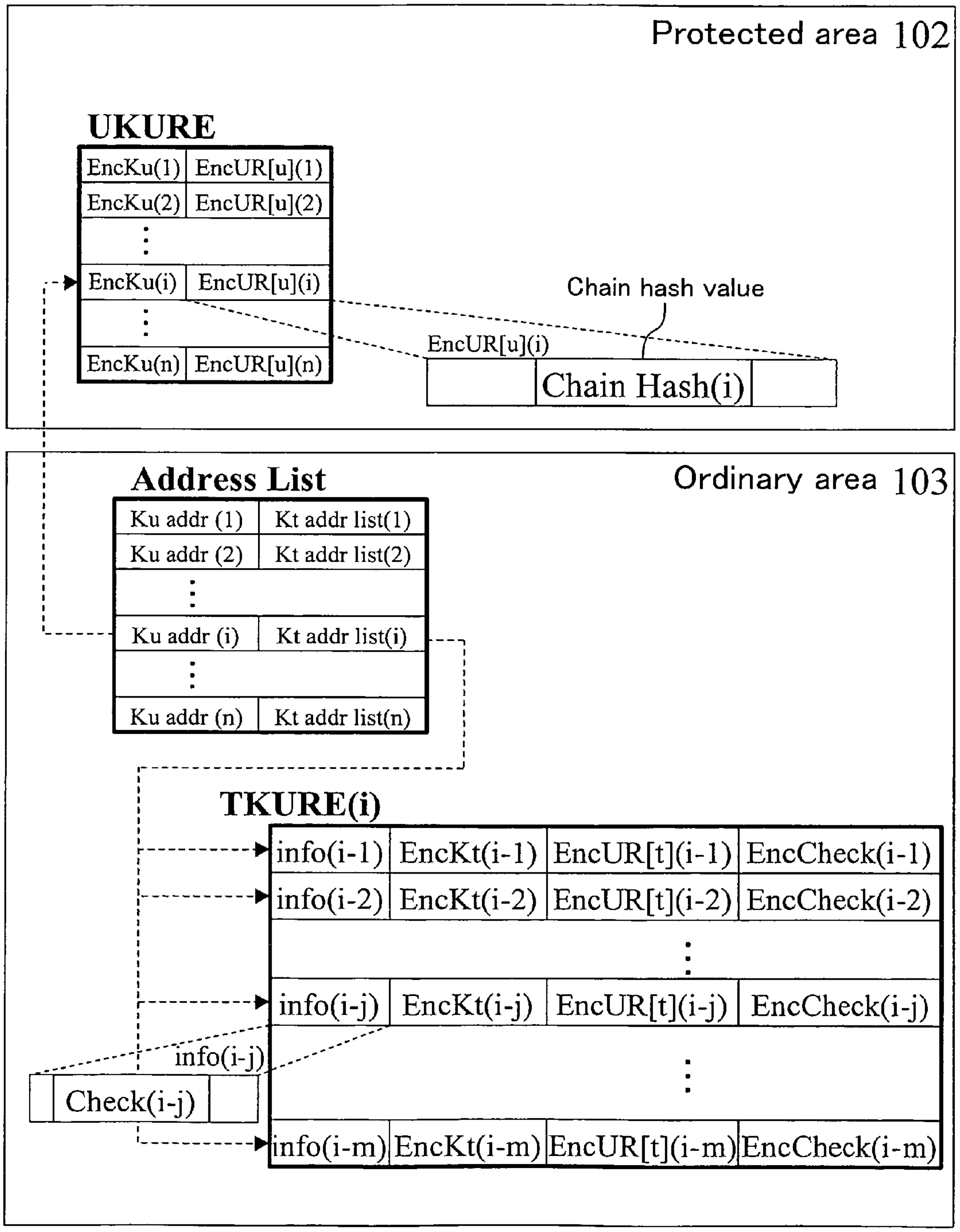
FIG. 9 is a diagram illustrating confidential information in a target apparatus in a second embodiment of the present invention.

In the second embodiment, confidential information stored in the target apparatus 10 is illustrated in FIG. 9. In the protected area 102, a domain key group UKURE is stored. In the ordinary area 103, a key correspondence table Address List and a content key group TKURE(i) are stored.

(Domain Key Group)

As in FIG. 3, the domain key group UKURE includes n encrypted domain keys EncKu(1) to EncKu(n) and n pieces of encrypted domain key management information EncUR[u](1) to EncUR[u](n). A chain hash value is stored at a predetermined position in each of the encrypted domain key management information EncUR[u](1) to EncUR[u](n). The chain hash value is generated based on a content key group corresponding to the encrypted domain key management information. For example, a chain hash value Chain Hash(i) is stored at a predetermined position in the encrypted domain key management information UR[u](i). The chain hash value Chain Hash(i) is generated based on the content key group TKURE(i).

Although only the content key group TKURE(i) corresponding to the encrypted domain key EncKu(i) is illustrated in FIG. 9, each of the encrypted domain keys EncKu(1) to EncKu(n) other than encrypted domain key EncKu(i) may also be associated with a content key group.

(Content Key Group)

The content key group TKURE(i) includes m encrypted check values EncCheck(i-1) to EncCheck(i-m) in addition to the content key group TKURE(i) of FIG. 3. The encrypted check values EncCheck(i-1) to EncCheck(i-m) are in one-to-one correspondence with the encrypted content key EncKt(i-1) to EncKt(i-m). In each of the additional information info(i-1) to info(i-m), a check value of a corresponding one of the encrypted check values EncCheck(i-1) to EncCheck(i-m) is stored in plain text (in FIG. 9, only a check value Check(i-j) is representatively illustrated). For example, a check value Check(i-j) in plain text is stored in the additional information info(i-j) of the encrypted content key EncKt(i-j) accompanied with the encrypted check value EncCheck(i-j). The check value Check(i-j) is also stored at a predetermined position in the corresponding additional information info(i-j) in accordance with a designated byte (information indicating the predetermined bit position).

The key correspondence table Address List is similar to that of FIG. 3.

<Encryption of Content Key and Information Accompanying it>

Next, a description will be given of how a content key, content key management information, and a check value are encrypted. Hereinafter, the content key Kt(i-j), the content key management information UR[t](i-j), and the check value Check(i-j) are illustrated.

The content key Kt(i-j) and the content key management information UR[t](i-j) are concatenated together. Next, in accordance with the designated byte, the check value Check (i-j) is buried at a predetermined position in the concatenated data including the content key Kt(i-j) and the content key management information UR[t](i-j). In this case, the check value is buried in the LSB. Next, the concatenated data in which the check value Check(i-j) is buried is encrypted in accordance with the chain encryption technique. Next, the encrypted concatenated data is divided into the encrypted content key EncKt(i-j), the encrypted content key management information EncUR[t](i-j), and the encrypted check value EncCheck(i-j).

In this manner, a content key, content key management information, and a check value are encrypted. A position where a check value is buried is specified with a designated byte, but not is a fixed position, and therefore, can be concealed, thereby improving the security.

<Procedure of Generating Chain Hash Value>

Figure 10:
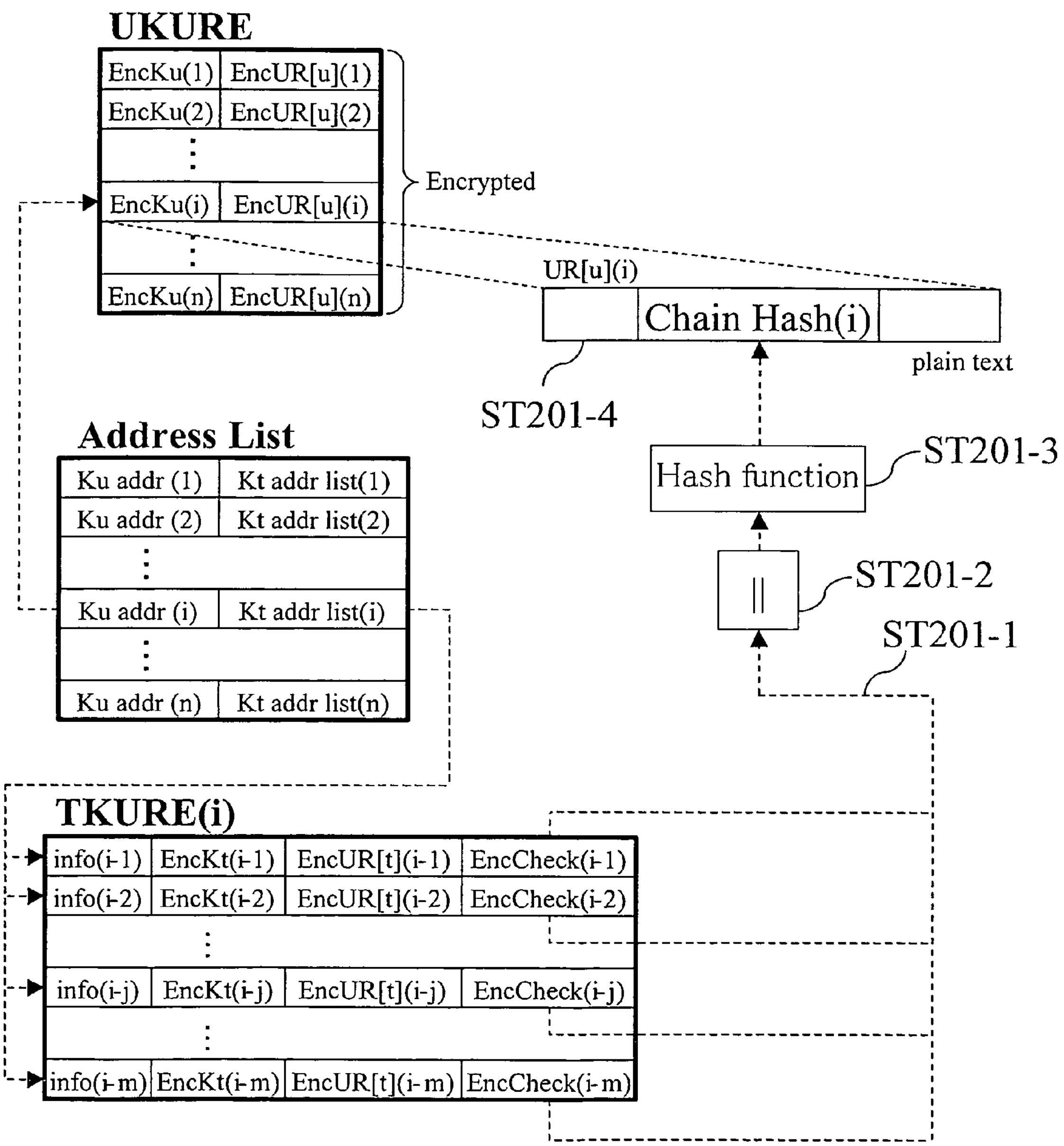
FIG. 10 is a diagram for explaining a procedure of generating a chain hash value illustrated in FIG. 9.

Next, a procedure of generating the chain hash value Chain Hash(i) of FIG. 9 will be described with reference to FIG. 10. Note that, as illustrated in FIG. 10, it is assumed that each of the encrypted content key management information EncUR [t](i-1) to EncUR[t](i-m) is located after a corresponding encrypted content key, and each of the encrypted check values EncCheck(i-1) to EncCheck(i-m) is located after corresponding encrypted content key management information. It is also assumed that each of the encrypted check values EncCheck (i-1) to EncCheck(i-m) is 8-byte data.

(Step ST201-1)

In accordance with the designated byte, m encrypted check values EncCheck(i-1) to EncCheck(i-m) are extracted from the content key group TKURE(i). For example, data located at a predetermined position (8-byte data located immediately after the encrypted content key management information EncUR[t](i-j)) is extracted from a set of the encrypted content key EncKt(i-j) and information accompanying it (the encrypted content key management information EncUR[t](i-j) and the encrypted check value EncCheck(i-j)). Thereby, the encrypted check value EncCheck(i-j) is extracted. Such an extraction process is performed with respect to each of the encrypted content keys EncKt(i-1) to EncKt(i-m), thereby extracting m encrypted check values EncCheck(i-1) to EncCheck(i-m).

(Step ST201-2)

Next, the m extracted encrypted check values EncCheck(i-1) to EncCheck(i-m) are concatenated together. Thereby, one piece of check value concatenated data is generated.

(Step ST201-3)

Next, a hash calculation is performed with respect to the check value concatenated data generated in step ST201-2. Thereby, a chain hash value Chain Hash(i) is calculated.

(Step ST201-4)

Next, the chain hash value Chain Hash(i) obtained in step ST201-3 is stored at a predetermined position in the domain key management information UR[u](i) and then encrypted as a whole.

Note that, when the encrypted domain key management information EncUR[u](i) is updated as a result of using an existing domain key to update, add, or delete a content key, the encrypted domain key management information EncUR [u](i) is temporarily decrypted into the domain key management information UR[u](i) before storing the chain hash value Chain Hash(i). Thereafter, when the chain hash value Chain Hash(i) is stored into the domain key management information UR[u](i), the domain key management information UR[u](i) is encrypted back to the encrypted domain key management information EncUR[u](i).

Note that, when a domain key is newly produced, the domain key management information UR[u](i) is also newly produced, and in this case, the temporary decryption is not required, and the chain hash value Chain Hash(i) is stored into the domain key management information UR[u](i), and the domain key management information UR[u](i) is encrypted to generate the encrypted domain key management information EncUR[u](i). Note that the check value is not necessarily an 8-byte value and may be a value of any byte number.

<Tampering Check Method>

Figure 11:
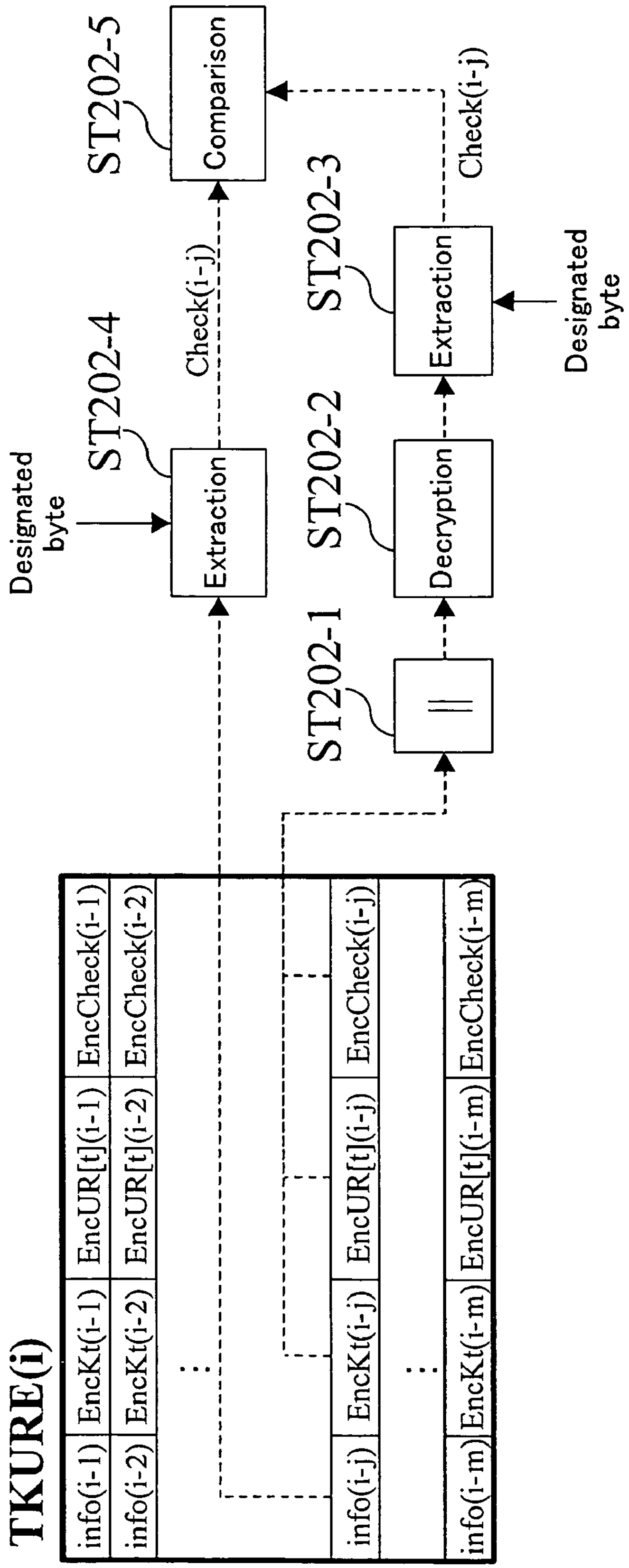
FIG. 11 is a diagram for explaining a procedure of checking tampering of a content key group illustrated in FIG. 9.

Next, a tampering check method which utilizes the check values Check(i-1) to Check(i-m) of FIG. 9 will be described with reference to FIG. 11, where the encrypted content key EncKt(i-j), the encrypted content key management information EncUR[t](i-j), and the encrypted check value EncCheck (i-j) are illustrated.

(Step ST202-1)

The encrypted content key EncKt(i-j), the encrypted content key management information EncUR[t](i-j), and the encrypted check value EncCheck(i-j) are concatenated together. Thereby, one piece of concatenated data is generated.

(Step ST202-2)

Next, the concatenated data is decrypted using the chain encryption technique. Thereby, concatenated data including the content key Kt(i-j), the content key management information UR[t](i-j), and the check value Check(i-j) is generated. This concatenated data has a structure such that the check value Check(i-j) is buried at a predetermined position in the concatenated data.

(Step ST202-3)

Next, in accordance with the designated byte, the check value Check(i-j) is extracted from the concatenated data including the content key Kt(i-j), the content key management information UR[t](i-j), and the check value Check(i-j). Next, the process goes to step ST202-5.

(Step ST202-4)

On the other hand, a check value Check(i-j) stored at a predetermined position in the additional information info(i-j) is extracted. Next, the process goes to step ST202-5.

(Step ST202-5)

Next, the check value Check(i-j) extracted in step ST202-3 is compared with the check value Check(i-j) extracted in step ST202-4.

Thus, for each of the content keys Kt(i-1) to Kt(i-m), a check value extracted from the additional information is compared with a check value extracted from the decrypted concatenated data, thereby checking the authenticity of the content key.

Note that a check value is preferably concatenated immediately after content key management information. Specifically, the check value is preferably the LSB of concatenated data including a content key, content key management information, and the check value. This is because, in the chain encryption technique, the authenticity of whole data to be decrypted can be checked by checking the LSB.

<Operation>

Next, an operation of the confidential information processing system of the second embodiment of the present invention will be described. The whole operation of the confidential information processing system of the second embodiment has a flow similar to that of FIG. 2, except for a detailed process of checking tampering of a content key (step ST22).

<Tampering Check for Content Key>

Figure 12:
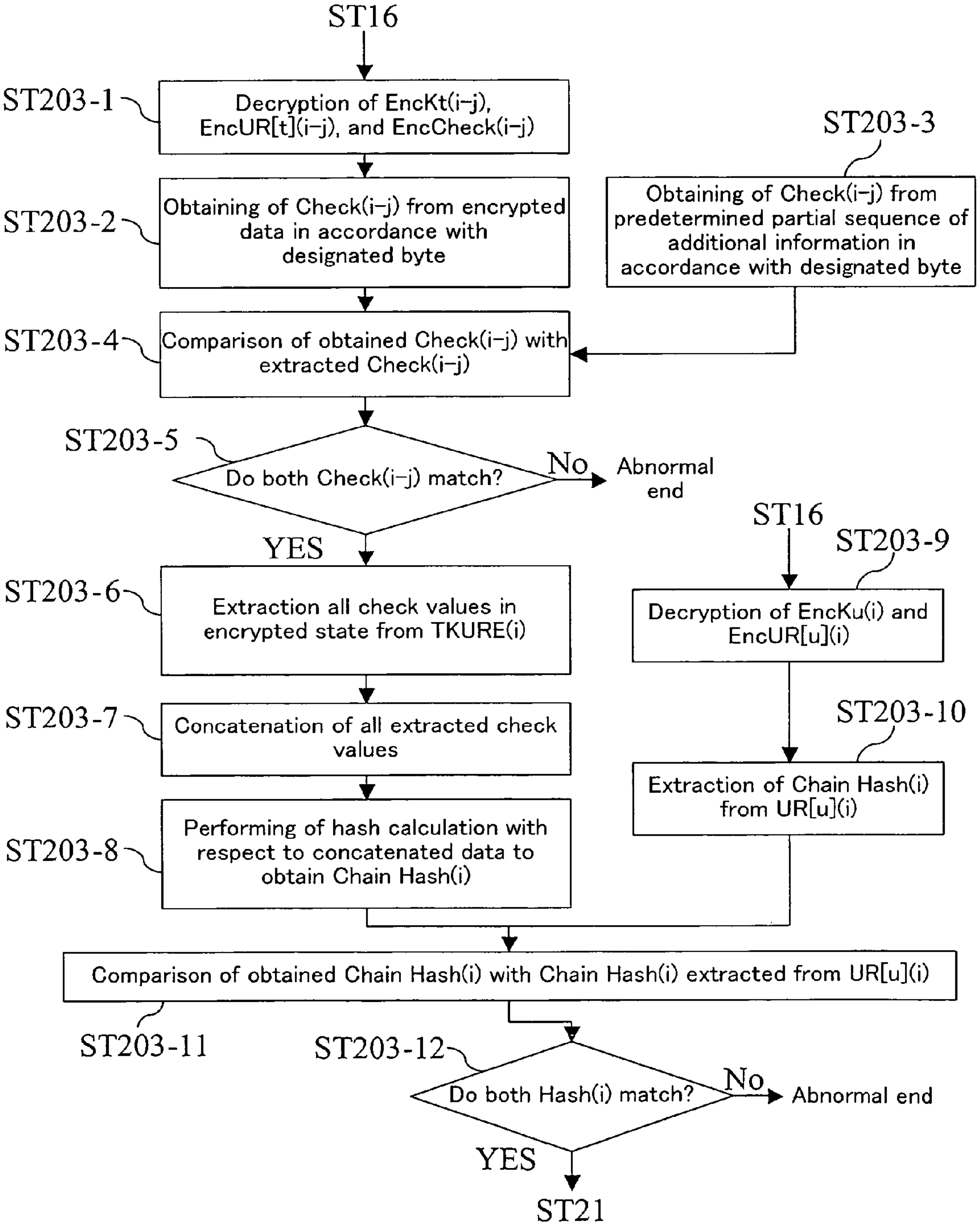
FIG. 12 is a flowchart illustrating a tampering check method according to the second embodiment of the present invention.

Referring to FIG. 12, a description will be given of how the host apparatus 11 checks tampering of a content key stored in the target apparatus 10 (step ST22) in the second embodiment. It is here assumed that tampering of the content key Kt(i-j) corresponding to the domain key Ku(i) is checked. It is also assumed that the check value Check(i-j) is 8-byte data concatenated immediately after the content key management information UR[t](i-j).

(Step ST203-1)

The host apparatus 11 decrypts the encrypted content key EncKt(i-j), the encrypted content key management information EncUR[t](i-j), and the encrypted check value EncCheck (i-j). These are encrypted as one piece of concatenated data using the above-described chain encryption technique, and therefore, the concatenated data is sequentially decrypted from the MSB (first 8 bytes).

(Step ST203-2)

Next, in accordance with the designated byte, the host apparatus 11 extracts 8-byte data from the concatenated data (including the content key Kt(i-j), the content key management information UR[t](i-j), and the check value Check(i-j)) which has been decrypted into plain text. Since it is here assumed that the check value Check(i-j) is concatenated immediately after the content key management information UR[t](i-j), the designated byte indicates the LSB (last 8 bytes). Thereby, the check value Check(i-j) is extracted from the concatenated data in plain text. Next, the process goes to step ST203-4.

(Step ST203-3)

On the other hand, the host apparatus 11 extracts 8-byte data from the additional information info(i-j). Thereby, the check value Check(i-j) is extracted from the additional information info(i-j).

(Step ST203-4)

Next, the host apparatus 11 compares the check value Check(i-j) extracted in step ST203-2 with the check value Check(i-j) extracted in step ST203-3. By comparing both the check values, the authenticity of concatenated data including a content key, content key management information, and the check value can be checked until a position where the check value is buried in the concatenated data.

(Step ST203-5)

When, as a result of the comparison in step ST203-4, it is determined that the check value Check(i-j) extracted in step ST203-2 does not match the check value Check(i-j) extracted in step ST203-3, the host apparatus 11 determines that the encrypted content key EncKt(i-j), the encrypted content key management information EncUR[t](i-j), or the encrypted check value EncCheck(i-j) is tampered, and aborts the process (abnormal end). On the other hand, when it is determined that both the check values match, the process goes to step ST203-6.

(Step ST203-6)

Next, in accordance with the designated byte, the host apparatus 11 extracts m encrypted check values EncCheck(i-1) to EncCheck(i-m) from the content key group TKURE(i). For example, the host apparatus 11 extracts 8-byte data from the concatenated data including the encrypted content key EncKt(i-j), the encrypted content key management information EncUR[t](i-j), and the encrypted check value EncCheck (i-j), in accordance with the designated byte. Thereby, the encrypted check value EncCheck(i-j) is extracted. The host apparatus 11 performs such an extraction process for each concatenated data to extract the m encrypted check values EncCheck(i-1) to EncCheck(i-m).

(Step ST203-7)

Next, the host apparatus 11 concatenates together the encrypted check values EncCheck(i-1) to EncCheck(i-m) extracted in step ST203-6. Thereby, one piece of check value concatenated data is generated.

(Step ST203-8)

Next, the host apparatus 11 performs a hash calculation with respect to the check value concatenated data generated in step ST203-7. Thereby, a chain hash value Chain Hash(i) is calculated. Next, the process goes to step ST203-11.

(Step ST203-9)

On the other hand, the host apparatus 11 references the key correspondence table Address List to detect the encrypted domain key EncKu(i) required for decryption of the encrypted content key EncKt(i-j). Thereafter, the host apparatus 11 uses an intermediate authentication key to decrypt the detected encrypted domain key EncKu(i) and encrypted domain key management information EncUR[u](i). Thereby, the host apparatus 11 obtains the domain key Ku(i) and the domain key management information UR[u](i). Wherein, the decrypted domain key is used for decryption of the content key in the step ST203-1.

(Step ST203-10)

Next, the host apparatus 11 extracts a chain hash value Chain Hash(i) stored at a predetermined bit position in the domain key management information UR[u](i).

(Step ST203-11)

Next, the host apparatus 11 compares the chain hash value Chain Hash(i) calculated in step ST203-8 with the chain hash value Chain Hash(i) extracted in step ST203-10.

(Step ST203-12)

When, as a result of the comparison in step ST203-11, it is determined that the chain hash value Chain Hash(i) calculated in step ST203-8 does not match the chain hash value Chain Hash(i) extracted in step ST203-10, the host apparatus 11 determines that the encrypted content key EncKt(i-j), the encrypted content key management information EncUR[t](i-j), or the encrypted check value EncCheck(i-j) is tampered, and aborts the process (abnormal end). On the other hand, when both the chain hash values match, the content key is judged valid, allowing the following process.

Using the thus-obtained content key Kt(i-j) in plain text, the host apparatus 11 decrypts encrypted contents.

As described above, when tampering is checked with respect to a content key, comparison is performed with respect to an extracted check value and a hash calculation is performed with respect to concatenated data including a check value corresponding to each encrypted content key. According to the above-described tampering check method, the processing amount can be significantly reduced, so that the processing speed can be increased, as compared to those of the tampering check method of FIG. 19.

It is considered that a content key will be added or deleted by distribution via a network in the future. In the second embodiment, when a content key is added, a check value corresponding to the added content key may be stored into additional information and the check value may be buried into any of the content key and content key management information and then encrypted. In this case, a tampering check can be performed with respected to the added content key. In addition, by performing a hash calculation with respect to concatenated data including an encrypted check value corresponding to the added content key and an existing encrypted check value (steps ST201-1 to ST201-4 are performed), a chain hash value can be updated. When a content key is deleted, encrypted check values corresponding to content keys which were not deleted may be extracted and concatenated together, and a hash calculation may be performed again (steps ST201-1 to ST201-4 are performed), thereby making it possible to update a chain check value.

Further, in the second embodiment, a tampering check with respect to each content key and a tampering check with respect to all check values are performed in different ways. Specifically, a tampering check with respect to each content key is performed by comparing check values using the chain encryption technique, while a tampering check with respect to all check values is performed by a hash calculation. Thus, since different tampering check methods are used, the security level can be improved.

Furthermore, since a check value is stored in additional information, a different check value can be provided for each content key. Thereby, the security can be improved.

<Entry>

In some target apparatuses, an area for storing a content key is reserved in the form of an entry. Each entry is associated with a domain key. An encrypted content key stored in an entry can be decrypted using a domain key associated with the entry. In this case, a concept emerges that check values corresponding to entries are concatenated together and the concatenated data is subjected to a hash calculation. Specifically, no matter whether a content key is actually stored, data may be extracted at a predetermined position in all entries associated with the same domain key, in accordance with a designated byte, the extracted data may be concatenated together and the concatenated data may be subjected to a hash calculation, and an obtained hash value may be stored into domain key management information. To reduce the processing amount, it is preferable that the amount of a hash calculation be small. Therefore, preferably, only entries in which a content key is actually stored are subjected to data extraction performed in accordance with a designate byte, the extracted data are concatenated together and the result is subjected to a hash calculation, and the resultant hash value is stored in domain key management information.

<Variations>

Various variations of the second embodiment of the present invention are conceived. Hereinafter, for example, three representative variations will be disclosed.

(1) Encrypted contents do not necessarily need to be stored in the same target apparatus as that in which an encrypted content key is stored, and may be stored in another recording medium. In this case, a host apparatus obtains encrypted contents which are stored in the other recording medium via a network or the like, and decrypts the encrypted contents using a content key whose authenticity is certified by the tampering check method of the second embodiment.

(2) A position where a check value is buried does not necessarily need to be designated using a designated byte and may be a fixed value. For example, if the check value is fixed and buried as an 8-byte LSB, tampering can be checked for all data (a content key, content key management information).

Figure 13:
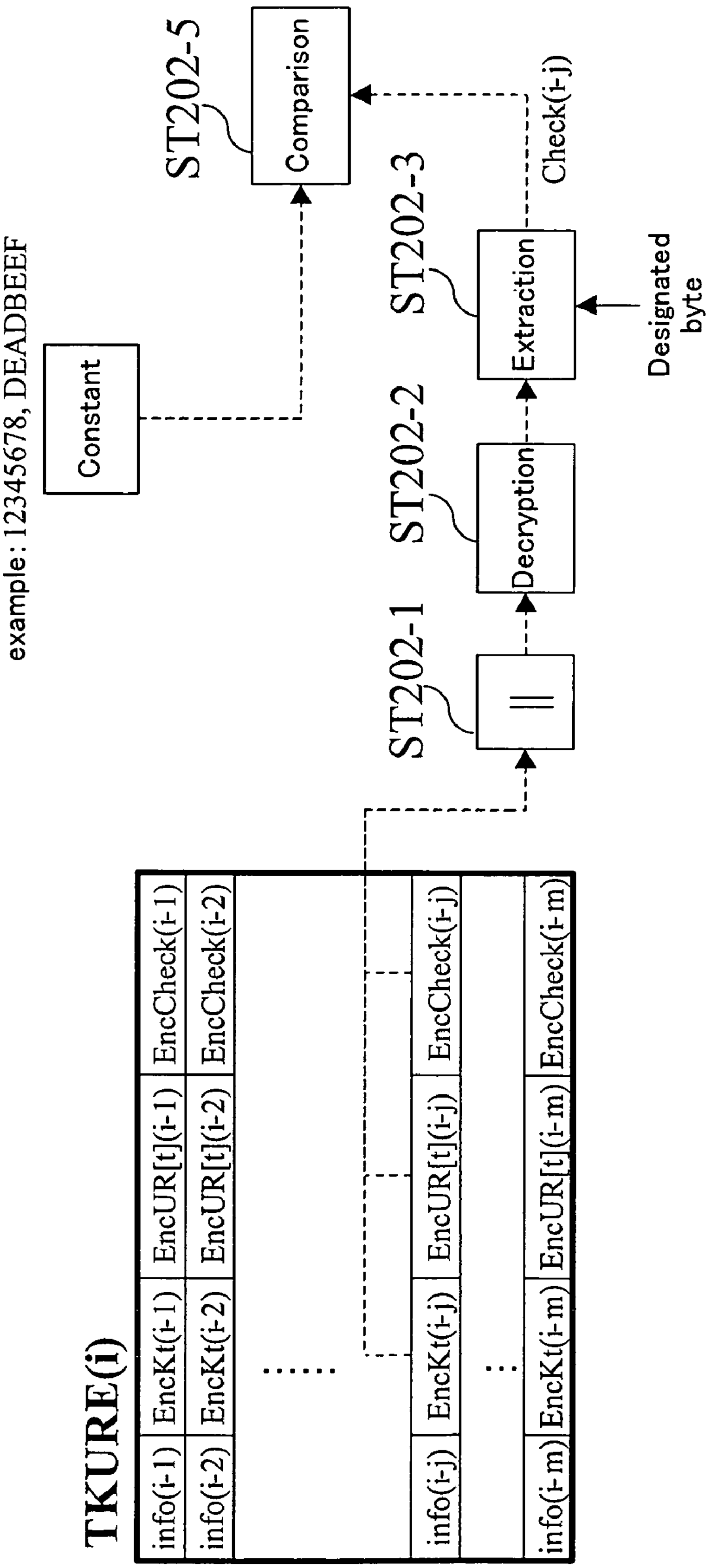
FIG. 13 is a diagram for explaining a variation of the second embodiment of the present invention.

(3) A check value does not necessarily need to be buried in additional information. Alternatively, as illustrated in FIG. 13, the check value may be stored as a constant in a register or the like. When such a constant has a certain regularity, the check value can be determined using a combination of operating devices or the like without a register. Generally, in order to implement such constant, a combination of operating devices is advantageous over a register in terms of the circuit area.

Third Embodiment

In a third embodiment of the present invention, a whole check value is used to detect tampering. The chain encryption technique is similar to that of FIG. 8. A method of checking tampering of a content key Kt(i-j) and information UR[t](i-j) accompanying it, is similar to that of the second embodiment.

<Structure>

A whole structure of a confidential information processing system according to a third embodiment of the present invention is similar to that of FIG. 1. Note that confidential information stored in the target apparatus 10 is different from that of FIG. 3.

<Confidential Information>

Figure 14:
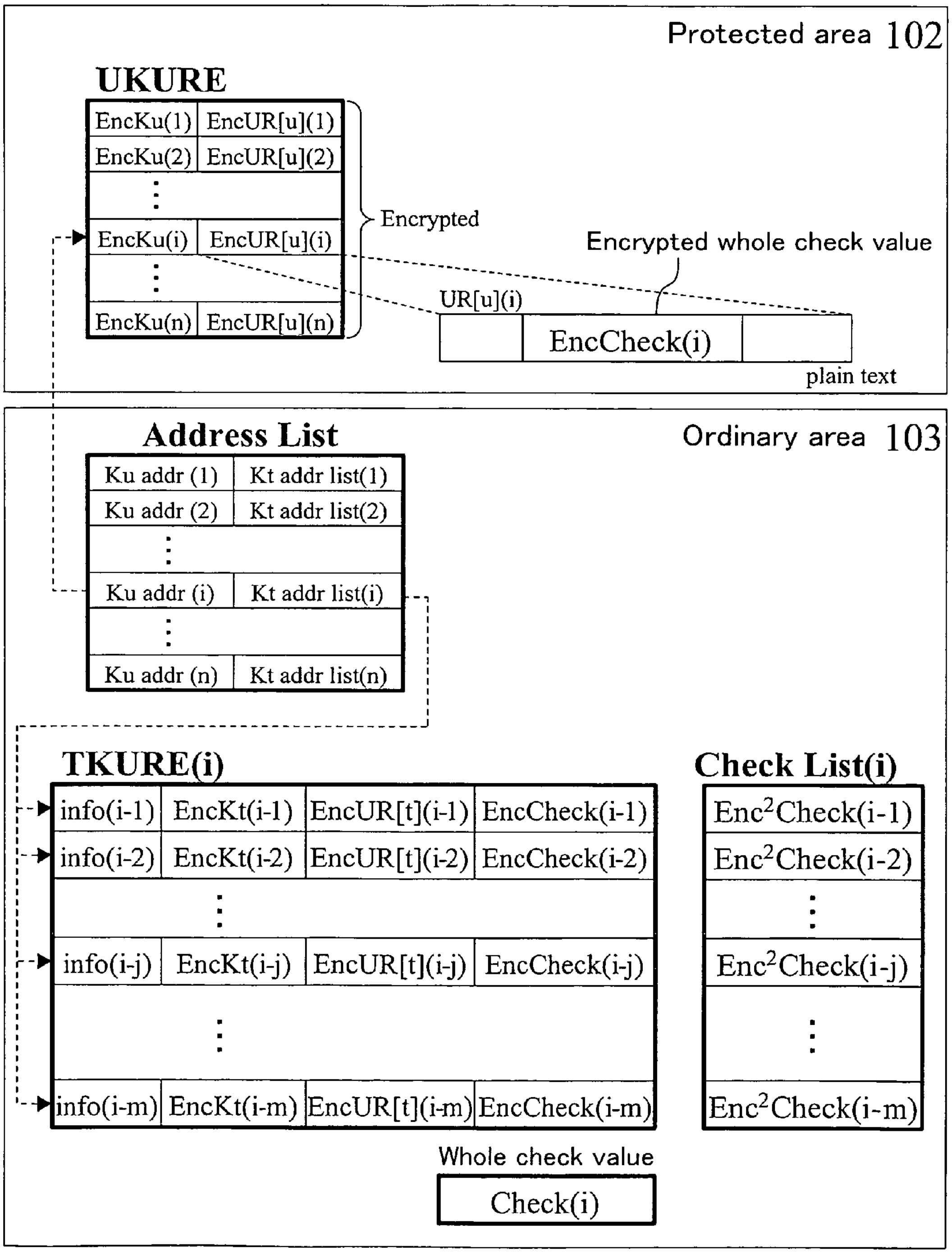
FIG. 14 is a diagram illustrating confidential information stored in a target apparatus in a third embodiment of the present invention.

FIG. 14 illustrates confidential information stored in the target apparatus 10 of the third embodiment. In the protected area 102, a domain key group UKURE is stored. In the ordinary area 103, a key correspondence table Address List, a content key group TKURE(i), a check value list Check List(i), and a whole check value Check(i) are stored.

(Domain Key Group)

The domain key group UKURE includes n encrypted domain keys EncKu(1) to EncKu(n) and n pieces of encrypted domain key management information EncUR[u](1) to EncUR[u](n), as in FIG. 14. An encrypted whole check value is stored at a predetermined position in each of the encrypted domain key management information EncUR[u](1) to EncUR[u](n). The encrypted whole check value is generated based on a content key group corresponding to the domain key and a whole check value. For example, an encrypted whole check value EncCheck(i) is stored at a predetermined position in the encrypted domain key management information EncUR[u](i). The encrypted whole check value EncCheck(i) is generated based on a content key group TKURE(i) and a whole check value Check(i).

Although only the content key group TKURE(i) corresponding to the encrypted domain key EncKu(i) is illustrated in FIG. 14, each of the encrypted domain keys EncKu(1) to EncKu(n) other than the encrypted domain key EncKu(i) may also be associated with a content key group.

(Content Key Group and Key Correspondence Table)

The content key group TKURE(i) and the key correspondence table Address List are similar to those of FIG. 9.

(Check Value List)

A check value list Check List(i) corresponds to the content key group TKURE(i). The check value list Check List(i) includes m double-encrypted check values $Enc^2$Check(i-1) to $Enc^2$Check(i-m). The double-encrypted check values $Enc^2$Check(i-1) to $Enc^2$Check(i-m) are in one-to-one correspondence with the encrypted check values EncCheck(i-1) to EncCheck(i-m) included in the content key group TKURE(i). Although only the check value list Check List(i) corresponding to the content key group TKURE(i) is illustrated in FIG. 14, a hash list corresponding to each content key group (not shown) other than the content key group TKURE(i) may also be present.

(Whole Check Value)

The whole check value Check(i) corresponds to the content key group TKURE(i). Although only the whole check value Check(i) corresponding to the content keyTKURE(i) is illustrated in FIG. 14, a whole check value corresponding to each content key group (not shown) other than the content key group TKURE(i) may also be present.

<Procedure of Generating Check Value List and Encrypted Check Value>

Figure 15:
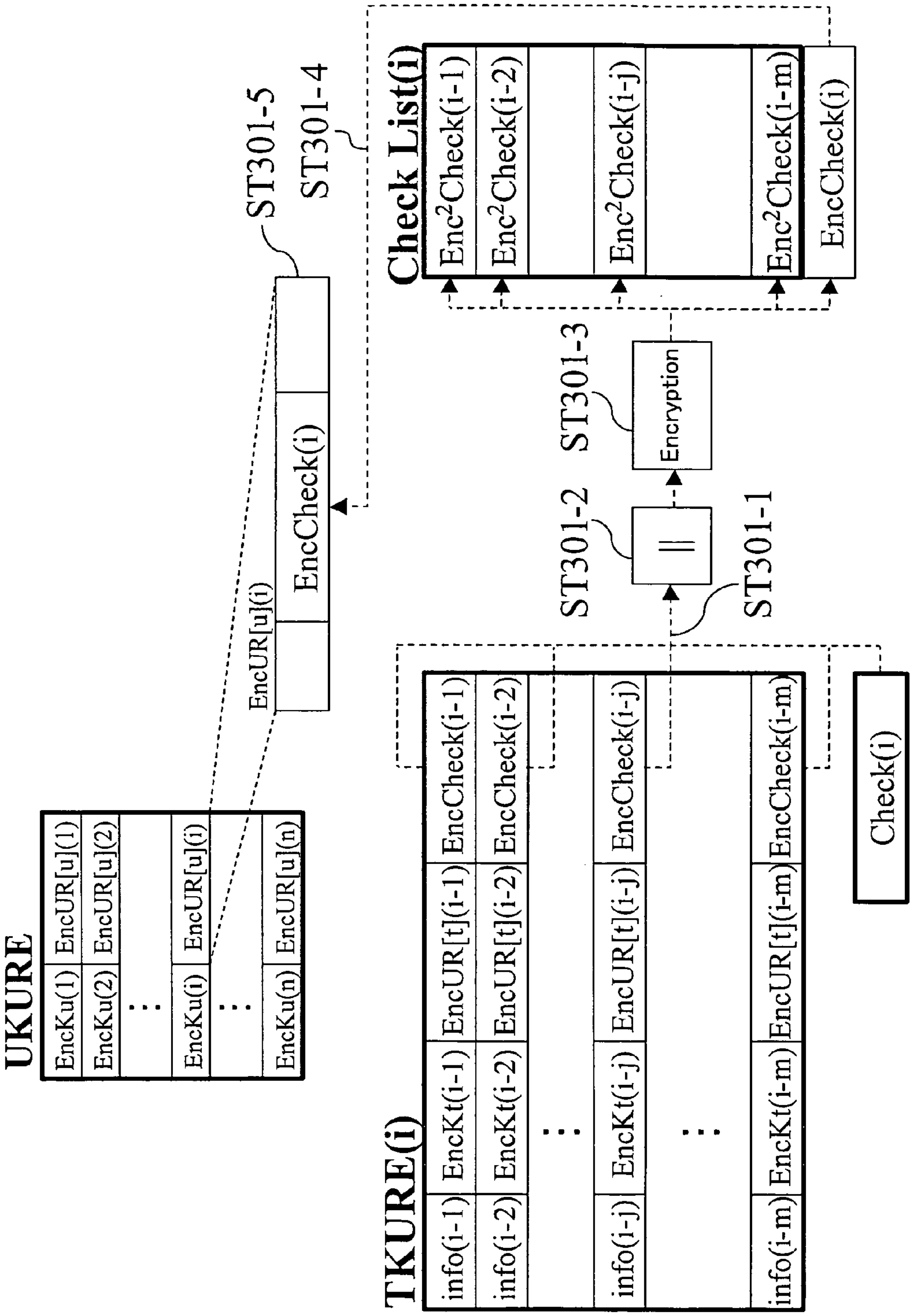
FIG. 15 is a diagram for explaining a procedure of generating a check value list and an encrypted whole check value illustrated in FIG. 14.

Next, a procedure of generating the check value list Check List(i) and the encrypted whole check value EncCheck(i) of FIG. 14 will be described with reference to FIG. 15.

(Step ST301-1)

In accordance with a designated byte, the m encrypted check values EncCheck(i-1) to EncCheck(i-m) are extracted from the content key group TKURE(i). For example, an encrypted check value EncCheck(i-j) is extracted from concatenated data including an encrypted content key EncKt(i-j), encrypted content key management information EncUR(i-j), and encrypted check value EncCheck(i-j). In this manner, the m encrypted check values EncCheck(i-1) to EncCheck(i-m) are extracted.

(Step ST301-2)

Next, the m encrypted check value EncCheck(i-1) to EncCheck(i-m) extracted in step ST301-1 and the whole check value Check(i) are concatenated together. Thereby, one piece of check value concatenated data is generated.

(Step ST301-3)

Next, the check value concatenated data is encrypted using the domain key Ku(i) in accordance with the chain encryption technique. Thereby, a set of the double-encrypted check values $Enc^2$Check(i-1) to $Enc^2$Check(i-m) and the encrypted whole check value EncCheck(i) is generated.

(Step ST301-4)

Next, the encrypted whole check value EncCheck(i) is taken out from the set of the double-encrypted check values $Enc^2$Check(i-1) to $Enc^2$Check(i-m) and the encrypted whole check value EncCheck(i). Thereby, the set of the double-encrypted check values $Enc^2$Check(i-1) to $Enc^2$Check(i-m) becomes the check value list Check List(i).

(Step ST301-5)

Next, the encrypted whole check value EncCheck(i) taken out in step ST301-4 is stored at a predetermined position in the domain key management information UR[u](i) and then encrypted as a whole.

Note that, when an existing domain key is used to update, add, or delete a content key to update the encrypted domain key management information EncUR[u](i), the encrypted domain key management information EncUR[u](i) is temporarily decrypted into the domain key management information UR[u](i) before storing the encrypted whole check value EncCheck(i). Thereafter, when the encrypted whole check value EncCheck(i) is stored into the domain key management information UR[u](i), the domain key management information UR[u](i) is encrypted back to the encrypted domain key management information EncUR[u](i).

Note that, when a domain key is newly produced, the domain key management information UR[u](i) is also newly produced, and in this case, temporary decryption is not required, and the whole check value Check(i) is stored into the domain key management information UR[u](i), and the domain key management information UR[u](i) is encrypted to generate the encrypted domain key management information EncUR[u](i).

<Tampering Check Method>

Figure 16:
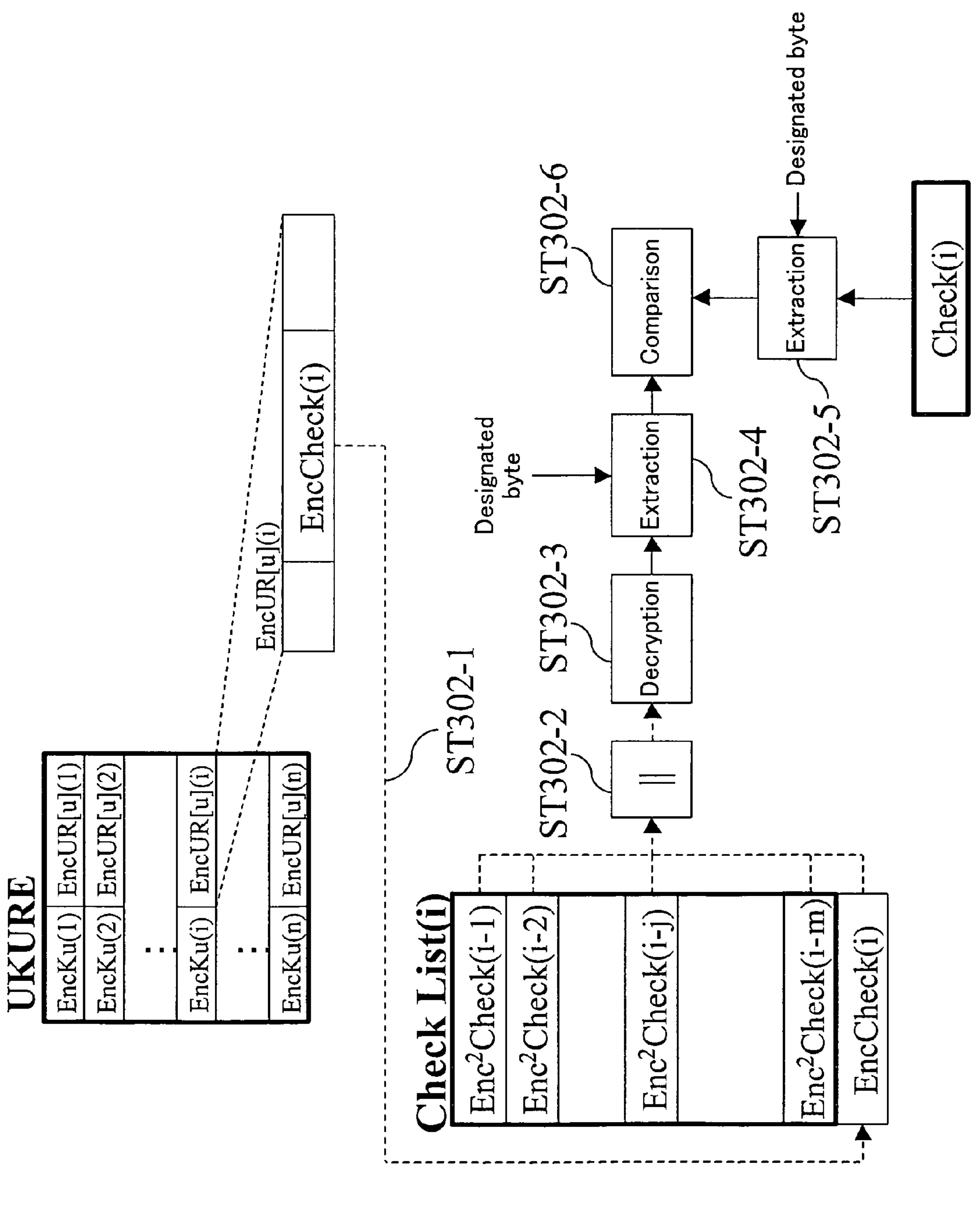
FIG. 16 is a diagram for explaining a procedure of checking tampering of the check value list of FIG. 14.
Figure 17:
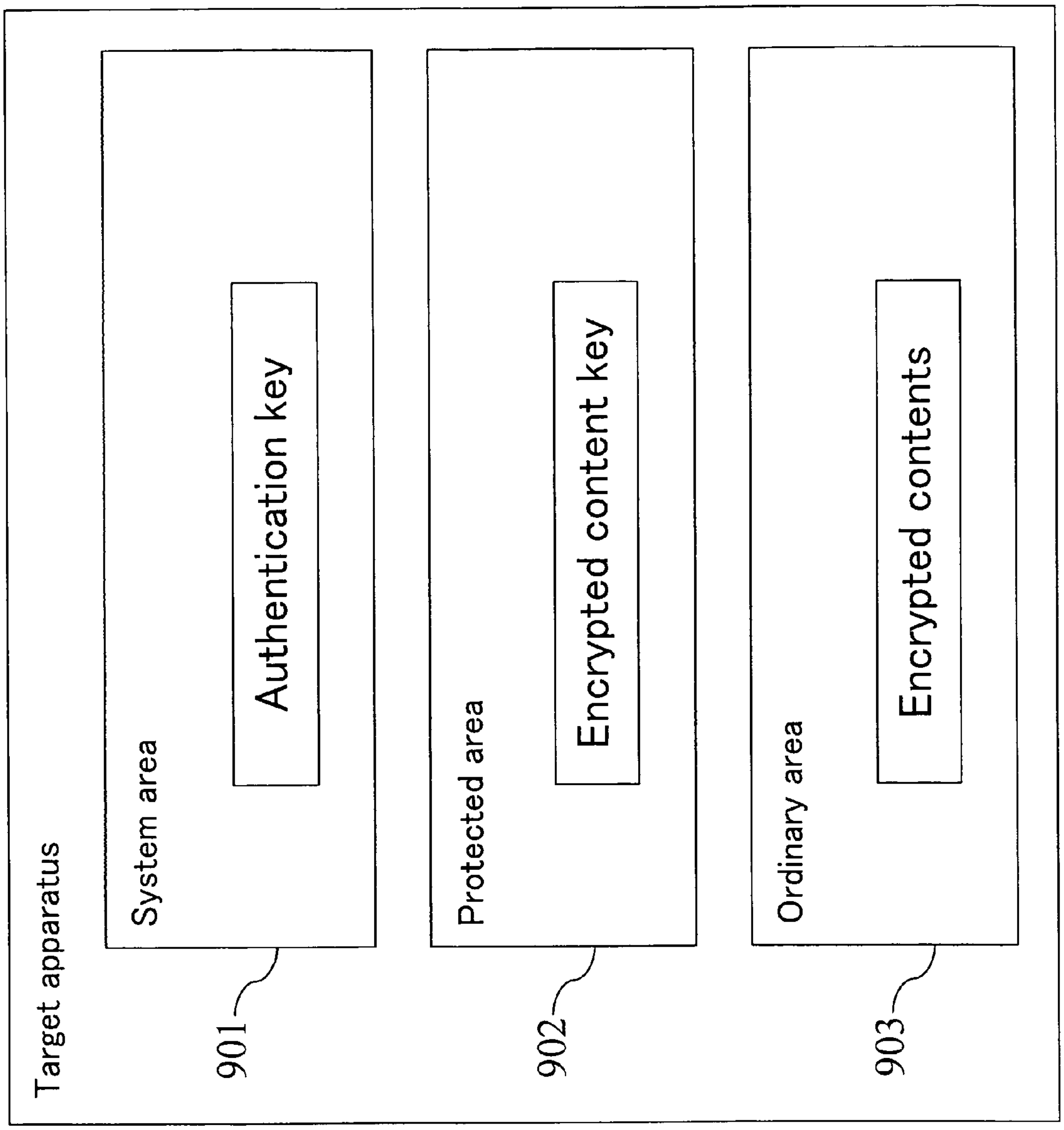
FIG. 17 is a diagram illustrating confidential information stored in a conventional target apparatus.
Figure 18:
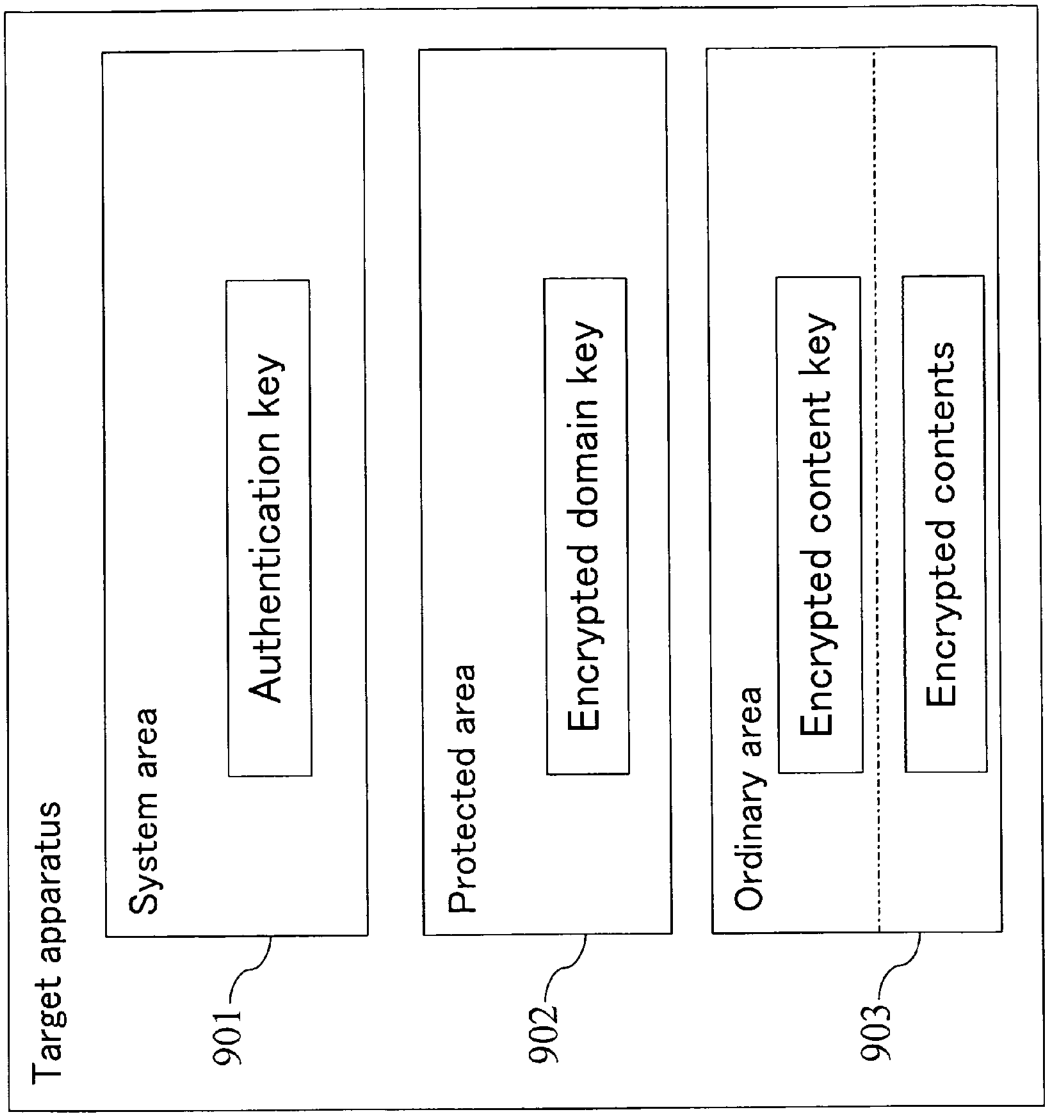
FIG. 18 is a diagram illustrating confidential information stored in a target apparatus where a domain key is set.

Next, a tampering check method using the whole check value Check(i) of FIG. 14 will be described with reference to FIG. 16, where the encrypted domain key EncKu(i), the check value list Check List(i), and the whole check value Check(i) are illustrated. Note that a tampering check method using the check values Check(i-1) to Check(i-m) of FIG. 14 is similar to that of the method of FIG. 11.

(Step ST302-1)

The encrypted domain key management information EncUR[u](i) is decrypt. Thereby, the domain key management information UR[u](i) is generated. Thereafter, the encrypted whole check value EncCheck(i) stored at a predetermined position in the domain key management information UR[u](i) is extracted.

(Step ST302-2)

Next, the m double-encrypted check values $Enc^2$Check(i-1) to $Enc^2$Check(i-m) present in the check value list Check List(i) are concatenated together. Thereafter, the encrypted whole check value EncCheck(i) extracted in step ST302-1 is concatenated after the concatenated data including the m double-encrypted check values $Enc^2$Check(i-1) to $Enc^2$Check(i-m). In other words, the LSB of the concatenated data including the double-encrypted check values $Enc^2$Check (i-1) to $Enc^2$Check(i-m) and the encrypted whole check value EncCheck(i), is the encrypted whole check value EncCheck (i). Thereby, one piece of check value concatenated data is generated.

(Step ST302-3)

Next, the check value concatenated data is decrypted using the domain key Ku(i) in accordance with the chain encryption technique. Thereby, a set of the m encrypted check values EncCheck(i-1) to EncCheck(i-m) and the whole check value Check(i) is generated.

(Step ST302-4)

Next, from the set of the m encrypted check values Check (i-1) to Check(i-m) and the whole check value Check(i), data at a predetermined position thereof (here, 8-byte data which is the LSB of the set) is extracted. Thereby, the whole check value Check(i) is extracted. Next, the process goes to step ST302-6.

(Step ST302-5)

On the other hand, in accordance with the designated byte, a whole check value Check(i) previously stored in the ordinary area 103 of the target apparatus 10 is extracted. Next, the process goes to step ST302-6.

(Step ST302-6)

Next, the whole check value Check(i) extracted in step ST302-4 is compared with the whole check value Check(i) extracted in step ST302-5. When both the whole check values Check(i) match, it is determined that tampering is not present in the check value list Check List(i) or the whole check value Check(i). On the other hand, when both the whole check values Check(i) do not match, it is determined that the check value list Check List(i) or the whole check value Check(i) is tampered, and the process is aborted (abnormal end).

Thus, the authenticity of the check value list Check List(i) can be checked. If the check value list is not tampered, tampering of an encrypted content key can be checked. For example, when it is desired to check tampering of the encrypted content key EncKt(i-j), the encrypted check value EncCheck(i-j) corresponding to the content key Kt(i-j) is extracted from the check value list Check List(i) decrypted in step ST302-3. On the other hand, the encrypted check value EncCheck(i-j) is extracted from the content key group TKURE(i). Thereafter, the encrypted check value EncCheck (i-j) extracted from the decrypt check value list Check List(i) is compared with the encrypted check value EncCheck(i-j) extracted from the content key group TKURE(i). In this manner, it is possible to check whether or not the encrypted content key EncKt(i-j) and the information accompanying it (the encrypted content key management information EncUR [t](i-j), etc.) are tampered.

<Operation>

Next, an operation of the confidential information processing system of the third embodiment will be described. The whole operation of the confidential information processing system of the third embodiment is similar to that of FIG. 2, except that details of a process of checking tampering of a content key (step ST22) are different. In the third embodiment, in step ST22, the authenticity of a content key is checked by performing the tampering check method of FIG. 11 (a tampering check method using the check values Check (i-1) to Check(i-m)) and the tampering check method of FIG. 16 (a tampering check method using the whole check value Check(i)).

As described above, when a tampering check is performed for one content key, an extracted check value is compared with a whole check value. According to the tampering check method, the processing amount can be significantly reduced, so that the processing speed can be increased, as compared to those of the tampering check method of FIG. 19.

It is considered that a content key is added or deleted by distribution via a network in the future. In the third embodiment, when a content key is added, a check value corresponding to the added content key may be stored into additional information and the check value may be encrypted and buried into any of the content key and content key management information. In this case, a tampering check can be performed with respected to the added content key. In addition, if concatenated data including an encrypted check value corresponding to the added content key and an existing encrypted check value is encrypted in accordance with the chain encryption technique (steps ST301-1 to ST301-3 are performed), a check value list can be updated. On the other hand, when a content key is deleted, encrypted check values corresponding to content keys which were not deleted may be extracted, and these encrypted check values may be concatenated together and encrypted again (steps ST301-1 to ST301-3 are performed), thereby making it possible to update a check value list. Also, a whole check value may be concatenated to a check value list and the resultant concatenated data may be encrypted using the chain encryption technique (steps ST301-4 and ST301-5 are performed), thereby making it possible to update a chain check value.

<Variations>

Various variations of the third embodiment of the present invention are conceived. Hereinafter, for example, three representative variations will be disclosed.

(1) Encrypted contents do not necessarily need to be stored in the same target apparatus as that in which an encrypted content key is stored, and may be stored in another recording medium. In this case, a host apparatus obtains encrypted contents which are stored in the other recording medium via a network or the like, and decrypts the encrypted contents using a content key whose authenticity is certified by the tampering check method of the third embodiment.

(2) A position where a whole check value is buried does not necessarily need to be designated using a designated byte and may be a fixed value. For example, if the whole check value is fixed and buried as an 8-byte LSB, tampering can be checked for all data (a content key, content key management information).

(3) A whole check value may be stored as a constant in a register or the like, similar to a check value for each content key. When such a constant has a certain regularity, the whole check value can be determined using a combination of operating devices or the like without using a register. Generally, a combination of operating devices is advantageous over a register in terms of the circuit area.

Figure 2:
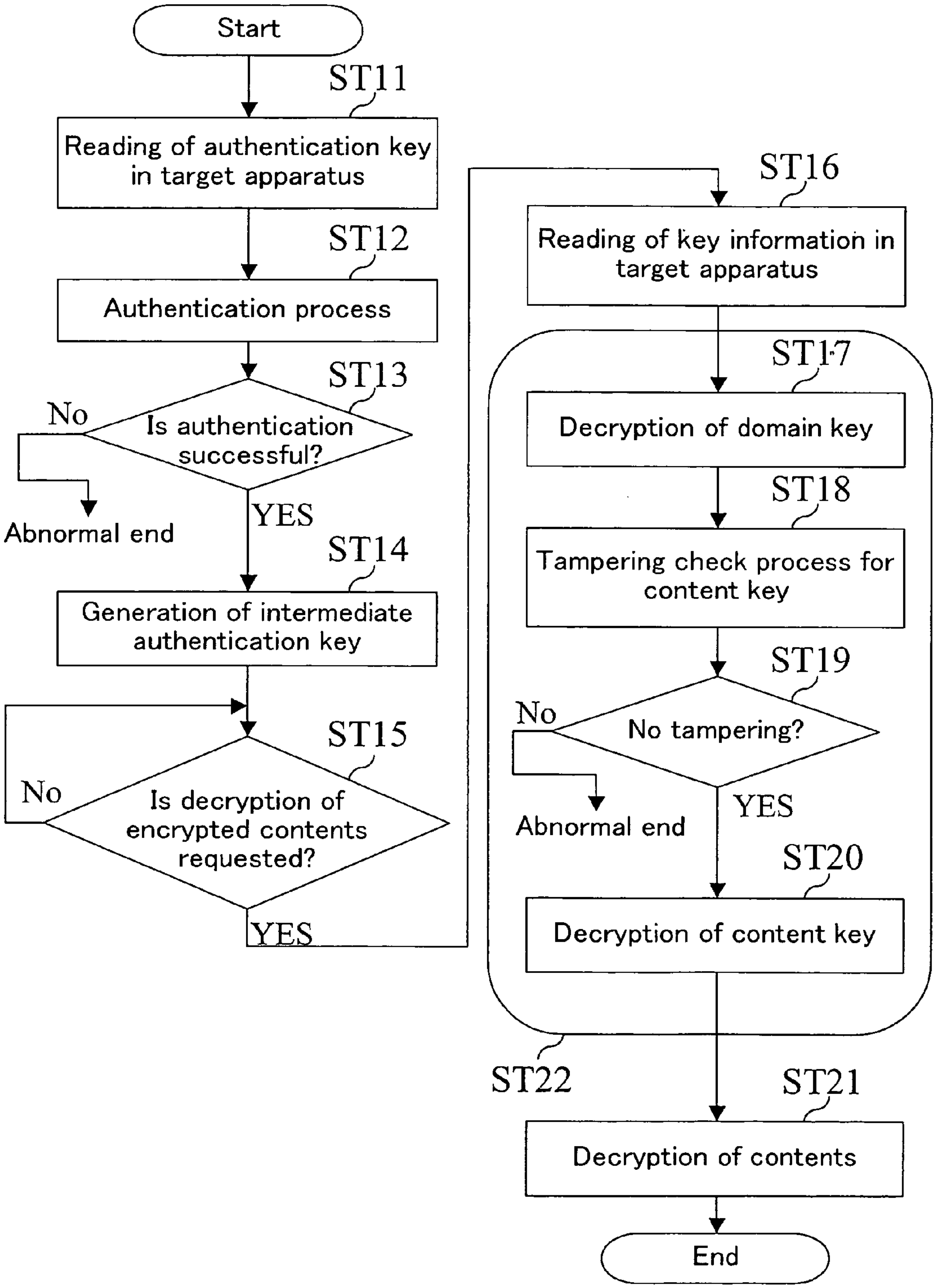
FIG. 2 is a flowchart schematically illustrating an operation of the confidential information processing system of FIG. 1.

In the above description of the embodiments, the schematic flowchart of FIG. 2 may be modified as appropriate, depending on a method of checking tampering of a content key in each embodiment (the process in step ST22). It is easy for those skilled in the art to modify the schematic flowchart of FIG. 2, depending on each embodiment.

According to the present invention, a tampering check can be performed with high speed. Therefore, the present invention can be used in, for example, a confidential information processing system comprising a target apparatus and a host apparatus.

What is claimed is:

1. A method of generating data for detecting tampering of a piece of content key information stored in a target apparatus, comprising the steps of:

extracting data at a predetermined position in each of a plurality of pieces of content key information, which include the piece of content key information and are encrypted using a piece of domain key information with a chain encryption technique, to obtain a plurality of extracted data;

concatenating the plurality of extracted data to obtain concatenated data;

performing a hash calculation with respect to the concatenated data to obtain a chain hash value; and storing the chain hash value in the target apparatus; wherein:

the piece of domain key information is stored in a first area of the target apparatus, the chain hash value stored in the target apparatus is included in the piece of domain key information, and the plurality of pieces of content key information are stored in a second area of the target apparatus different from the first area.

2. The method of claim 1, wherein each of the plurality of pieces of content key information includes a content key for reproducing contents and content key management information for managing the content key.

3. The method of claim 1, wherein:

the first area is a protected area which permits only a predetermined access;

the second area is an ordinary area which permits any access from a user.

4. The method of claim 1, wherein the data at a predetermined position is data having a predetermined length located at a least significant place of one of the plurality of pieces of content key information.

5. The method of claim 1, wherein the data at a predetermined position in plain text is common to the plurality of pieces of content key information.

6. The method of claim 1, wherein the data at a predetermined position in plain text is a constant.

7. The method of claim 1, wherein the piece of domain key information includes a domain key used to encrypt the plurality of pieces of content key information and domain key management information for managing the domain key.

8. A method of generating data for detecting tampering of a piece of content key information stored in a target apparatus, comprising steps of:

encrypting a plurality of pieces of content key information, including the piece of content key information, using a piece of domain key information, with a chain encryption technique;

extracting data at a predetermined position in each of the plurality of pieces of content key information, to obtain a plurality of extracted data;

concatenating the plurality of extracted data to obtain concatenated data;

performing a hash calculation with respect to the concatenated data to obtain a chain hash value; and storing the chain hash value in the target apparatus; wherein:

the piece of domain key information is stored in a first area of the target apparatus, the chain hash value stored in the target apparatus is included in the piece of domain key information, and the plurality of pieces of content key information are stored in a second area of the target apparatus different from the first area.

9. The method of claim 8, wherein the plurality of pieces of content key information includes a content key for reproducing contents and content key management information for managing the content key.

10. The method of claim 8, wherein:

the first area is a protected area which permits only a predetermined access;

the second area is an ordinary area which permits any access from a user.

11. The method of claim 8, wherein the data at a predetermined position is data having a predetermined length located at a least significant place of one of the plurality of pieces of content key information.

12. The method of claim 8, wherein the data at a predetermined position in plain text is common to the plurality of pieces of content key information.

13. The method of claim 8, wherein the data at a predetermined position in plain text is a constant.

14. The method of claim 8, wherein the piece of domain key information includes a domain key used to encrypt the plurality of pieces of content key information and domain key management information for managing the domain key.

15. A method of generating data for detecting tampering of a piece of content key information stored in a target apparatus, comprising steps of:

extracting data at a predetermined position in each of a plurality of pieces of content key information, which include the piece of content key information and are encrypted using a piece of domain key information with a chain encryption technique, to obtain a plurality of extracted data;

concatenating the plurality of extracted data to obtain concatenated data;

performing a hash calculation with respect to the concatenated data to obtain a chain hash value; and storing the chain hash value in the target apparatus; wherein:

the piece of domain key information is stored in a protected area of the target apparatus, the chain hash value stored in the target apparatus is included in the piece of domain key information, the plurality of pieces of content key information are stored in a ordinary area of the target apparatus different from the protected area, the protected area can be accessed only after successful authentication, and the ordinary area can be arbitrarily accessed by a user.

16. The method of claim 15, wherein the plurality of pieces of content key information includes a content key for reproducing contents and content key management information for managing the content key.

17. The method of claim 15, wherein the data at a predetermined position is data having a predetermined length located at a least significant place of one of the plurality of pieces of content key information.

18. The method of claim 15, wherein the data at a predetermined position in plain text is common to the plurality of pieces of content key information.

19. The method of claim 15, wherein the data at a predetermined position in plain text is a constant.

20. The method of claim 15, wherein the piece of domain key information includes a domain key used to encrypt the plurality of pieces of content key information and domain key management information for managing the domain key.

21. The method of claim 20, wherein the chain hash value is included in the domain key management information.

* * * * *